United States Patent
Ryu et al.

(10) Patent No.: US 10,375,685 B2
(45) Date of Patent: Aug. 6, 2019

(54) SECONDARY TIMING ADVANCE GROUPS WITH ONLY LICENSE ASSISTED ACCESS SECONDARY CELLS

(71) Applicant: QUALCOMM Incorporated, San Diego, CA (US)

(72) Inventors: Jae Ho Ryu, San Diego, CA (US); Valentin Alexandru Gheorghiu, Tokyo (JP); Chengjin Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/874,224

(22) Filed: Jan. 18, 2018

(65) Prior Publication Data

US 2018/0213512 A1     Jul. 26, 2018

Related U.S. Application Data

(60) Provisional application No. 62/448,854, filed on Jan. 20, 2017.

(51) Int. Cl.
*H04W 72/04* (2009.01)
*H04W 16/14* (2009.01)
(Continued)

(52) U.S. Cl.
CPC .......... *H04W 72/042* (2013.01); *H04L 5/001* (2013.01); *H04L 5/0098* (2013.01);
(Continued)

(58) Field of Classification Search
CPC ............... H04W 72/04; H04W 72/042; H04W 72/0446; H04W 72/12; H04W 16/14;
(Continued)

(56) References Cited

U.S. PATENT DOCUMENTS

2017/0006607 A1* 1/2017 Etemad ................... H04W 4/70
2017/0346685 A1* 11/2017 Wang ...................... H04L 5/001
(Continued)

FOREIGN PATENT DOCUMENTS

WO    WO-2016105175 A1    6/2016
WO    2017073651 A1 *    5/2017
(Continued)

OTHER PUBLICATIONS

International Search Report and Written Opinion—PCT/US2018/014469—ISA/EPO—dated Jun. 25, 2018.
(Continued)

*Primary Examiner* — Afsar M Qureshi
(74) *Attorney, Agent, or Firm* — Holland & Hart LLP

(57) ABSTRACT

Methods, systems, and devices for wireless communication are described. A wireless system may support efficient techniques for adding license assisted access (LAA) secondary cells (SCells) to a secondary timing advance group (sTAG). For example, a base station may determine whether to add an LAA SCell to an sTAG based on whether the LAA SCell is a scheduling carrier for a user equipment (UE). That is, the base station may determine whether to add an LAA SCell to an sTAG based on whether a UE scheduled to communicate over the LAA SCell is self-scheduled over the LAA SCell or cross-carrier scheduled over another cell. As such, the wireless system may improve the likelihood that a UE may receive a downlink transmission over an LAA SCell in an sTAG that the UE may use to determine a downlink timing reference for an uplink transmission over the LAA SCell.

30 Claims, 15 Drawing Sheets

(51) Int. Cl.
*H04L 5/00* (2006.01)
*H04W 56/00* (2009.01)
*H04L 27/00* (2006.01)
*H04W 72/12* (2009.01)

(52) U.S. Cl.
CPC ......... *H04L 27/0006* (2013.01); *H04W 16/14* (2013.01); *H04W 56/0005* (2013.01); *H04W 56/0045* (2013.01); *H04W 72/0446* (2013.01); *H04W 72/12* (2013.01)

(58) Field of Classification Search
CPC ......... H04W 56/0005; H04W 56/0045; H04W 28/06; H04W 24/10; H04L 5/001; H04L 5/0048; H04L 5/0053; H04L 5/0098; H04L 27/0006
See application file for complete search history.

(56) References Cited

U.S. PATENT DOCUMENTS

2018/0132209 A1* 5/2018 Shimezawa .............. H04J 11/00
2018/0317092 A1* 11/2018 Harada ................. H04L 5/0048

FOREIGN PATENT DOCUMENTS

| WO | 2017171922 A1 | * | 10/2017 |
| WO | 2018083023 A1 | * | 5/2018 |
| WO | WO-2018083023 A1 | | 5/2018 |

OTHER PUBLICATIONS

LG Electronics Inc; "TA Handling in LAA SCell," 3GPP Draft; R2-165639 TA Handling in LAA Scell, 3rd Generation Partnership Project (3GPP), Mobile Competence Centre; 650, Route Des Lucioles; F-06921 Sophia-Antipolis Cedex; France, vol. RAN WG2, No. Goteborg, Sweden; 20160822-20160826, Aug. 13, 2016 (Aug. 13, 2016), XP051142843, 2 pages, Retrieved from the Internet: URL: http://www.3gpp.org/ftp/tsg_ran/WG2_RL2/TSGR2_95/Docs/ [retrieved on Aug. 13, 2016].

Nokia., et al., "Support of FS3-Only TAGs," 3GPP Draft; R4-1609750 Support of FS3-Only Tags, 3rd Generation Partnership Project (3GPP), Mobile Competence Centre; 650, Route Des Lucioles; F-06921 Sophia-Antipolis Cedex; France, vol. RAN WG4, No. Reno, US; Nov. 14, 2016-Nov. 18, 2016, Nov. 14, 2016 (Nov. 14, 2016), XP051179969, 4 pages, Retrieved from the Internet: URL: http://www.3gpp.org/ftp/Meetings_3GPP_SYNC/RAN4/Docs/ [retrieved on Nov. 14, 2016].

* cited by examiner

SECONDARY TIMING ADVANCE GROUPS WITH ONLY LICENSE ASSISTED ACCESS SECONDARY CELLS

CROSS REFERENCES

The present Application for Patent claims priority to U.S. Provisional Patent Application No. 62/448,854 by Ryu, et al., entitled "Secondary Timing Advance Groups With Only License Assisted Access Secondary Cells," filed Jan. 20, 2017, assigned to the assignee hereof.

BACKGROUND

The following relates generally to wireless communication and more specifically to secondary timing advance groups (sTAGs) with only license assisted access (LAA) secondary cells (SCells).

Wireless communication systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

Some wireless communications systems may utilize timing advance techniques to align uplink transmissions from multiple UEs to a base station. In particular, a UE may identify a timing advance and a downlink reference time, and the UE may transmit to a base station based on the timing advance and the downlink reference time such that the uplink transmission is aligned with other uplink transmissions from other UEs. The UE may determine the downlink reference time based on a downlink transmission received from a base station. In some cases, however, a UE may not receive a downlink transmission from a base station, and, as a result, the UE may not be able to determine a downlink reference time for an uplink transmission. In such cases, the UE may be forced to suspend the uplink transmission, which may result in additional latency and reduced throughput in a wireless system.

SUMMARY

The described techniques relate to improved methods, systems, devices, or apparatuses that support secondary timing advance groups (sTAGs) with only license assisted access (LAA) secondary cells (SCells). Generally, the described techniques provide for adding LAA SCells to an sTAG based on specific criteria to improve the likelihood that a user equipment (UE) may receive a downlink transmission from a base station over an LAA SCell in the sTAG. The UE may determine a downlink timing reference based on downlink transmissions received over one or more LAA SCells, and the UE may receive timing advance information from the base station. Using the timing advance information and the downlink timing reference, the UE may be able to determine the appropriate timing for an uplink transmission.

A method for wireless communication at a base station is described. The method may include connecting to a UE in an LAA mode using a primary cell (PCell) and an SCell associated with a shared radio frequency spectrum band, determining a scheduling carrier over which scheduling information is provided to the UE for uplink transmissions from the UE over the SCell, adding the SCell to an sTAG based at least in part on the shared radio frequency spectrum band of the SCell and the determination of the scheduling carrier, and transmitting timing advance information associated with the sTAG to the UE for uplink transmissions over the SCell.

An apparatus for wireless communication at a base station is described. The apparatus may include means for connecting to a UE in an LAA mode using a PCell and an SCell associated with a shared radio frequency spectrum band, means for determining a scheduling carrier over which scheduling information is provided to the UE for uplink transmissions from the UE over the SCell, means for adding the SCell to an sTAG based at least in part on the shared radio frequency spectrum band of the SCell and the determination of the scheduling carrier, and means for transmitting timing advance information associated with the sTAG to the UE for uplink transmissions over the SCell.

Another apparatus for wireless communication at a base station is described. The apparatus may include a processor, memory in electronic communication with the processor, and instructions stored in the memory. The instructions may be operable to cause the processor to connect to a UE in an LAA mode using a PCell and an SCell associated with a shared radio frequency spectrum band, determine a scheduling carrier over which scheduling information is provided to the UE for uplink transmissions from the UE over the SCell, add the SCell to an sTAG based at least in part on the shared radio frequency spectrum band of the SCell and the determination of the scheduling carrier, and transmit timing advance information associated with the sTAG to the UE for uplink transmissions over the SCell.

A non-transitory computer readable medium for wireless communication at a base station is described. The non-transitory computer-readable medium may include instructions operable to cause a processor to connect to a UE in an LAA mode using a PCell and an SCell associated with a shared radio frequency spectrum band, determine a scheduling carrier over which scheduling information is provided to the UE for uplink transmissions from the UE over the SCell, add the SCell to an sTAG based at least in part on the shared radio frequency spectrum band of the SCell and the determination of the scheduling carrier, and transmit timing advance information associated with the sTAG to the UE for uplink transmissions over the SCell.

In some examples of the method, apparatus, and non-transitory computer-readable medium described above, determining the scheduling carrier includes identifying the SCell as the scheduling carrier, where the SCell may be added to the sTAG based on the identification of the SCell as the scheduling carrier. In some examples of the method, apparatus, and non-transitory computer-readable medium described above, determining the scheduling carrier includes identifying a carrier other than the SCell as the scheduling carrier.

Some examples of the method, apparatus, and non-transitory computer-readable medium described above may further include processes, features, means, or instructions for obtaining, based on identifying the carrier other than the SCell as the scheduling carrier, a connected mode discontinuous reception (CDRX) status of the UE, where the CDRX status indicates that CDRX is not configured for the UE and the SCell may be added to the sTAG based on the obtained CDRX status. Some examples of the method, apparatus, and non-transitory computer-readable medium described above may further include processes, features, means, or instructions for obtaining, based on identifying the carrier other than the SCell as the scheduling carrier, a traffic parameter for downlink transmissions to the UE over the SCell, where the SCell may be added to the sTAG based on the traffic parameter.

In some examples of the method, apparatus, and non-transitory computer-readable medium described above, the sTAG includes only LAA SCells. In some examples of the method, apparatus, and non-transitory computer-readable medium described above, the PCell and SCell may be geographically separated. In some examples of the method, apparatus, and non-transitory computer-readable medium described above, the PCell may be associated with a licensed carrier and the SCell may be associated with an unlicensed carrier. In some examples of the method, apparatus, and non-transitory computer-readable medium described above, the uplink transmissions include physical uplink shared channel (PUSCH) transmissions, physical uplink control channel (PUCCH) transmissions, or sounding reference signal (SRS) transmissions.

A method for wireless communication at a UE is described. The method may include connecting to a base station in an LAA mode using a PCell and an LAA SCell associated with a shared radio frequency spectrum band, receiving timing advance information associated with an sTAG dedicated to LAA SCells, where the LAA SCell is a member of the sTAG, identifying a downlink timing reference for an uplink transmission over the LAA SCell, and transmitting the uplink transmission over the LAA SCell based at least in part on the identified downlink timing reference and the received timing advance information.

An apparatus for wireless communication at a UE is described. The apparatus may include means for connecting to a base station in an LAA mode using a PCell and an LAA SCell associated with a shared radio frequency spectrum band, means for receiving timing advance information associated with an sTAG dedicated to LAA SCells, where the LAA SCell is a member of the sTAG, means for identifying a downlink timing reference for an uplink transmission over the LAA SCell, and means for transmitting the uplink transmission over the LAA SCell based at least in part on the identified downlink timing reference and the received timing advance information.

Another apparatus for wireless communication at a UE is described. The apparatus may include a processor, memory in electronic communication with the processor, and instructions stored in the memory. The instructions may be operable to cause the processor to connect to a base station in an LAA mode using a PCell and an LAA SCell associated with a shared radio frequency spectrum band, receive timing advance information associated with an sTAG dedicated to LAA SCells, where the LAA SCell is a member of the sTAG, identify a downlink timing reference for an uplink transmission over the LAA SCell, and transmit the uplink transmission over the LAA SCell based at least in part on the identified downlink timing reference and the received timing advance information.

A non-transitory computer readable medium for wireless communication at a UE is described. The non-transitory computer-readable medium may include instructions operable to cause a processor to connect to a base station in an LAA mode using a PCell and an LAA SCell associated with a shared radio frequency spectrum band, receive timing advance information associated with an sTAG dedicated to LAA SCells, where the LAA SCell is a member of the sTAG, identify a downlink timing reference for an uplink transmission over the LAA SCell, and transmit the uplink transmission over the LAA SCell based at least in part on the identified downlink timing reference and the received timing advance information.

Some examples of the method, apparatus, and non-transitory computer-readable medium described above may further include processes, features, means, or instructions for determining a scheduling carrier over which scheduling information may be provided to the UE for uplink transmissions from the UE over the LAA SCell, where the downlink timing reference for the uplink transmission may be identified based at least in part on the determination of the scheduling carrier. In some examples of the method, apparatus, and non-transitory computer-readable medium described above, identifying the downlink timing reference for the uplink transmission includes identifying the downlink timing reference for the uplink transmission based at least in part on a downlink transmission received over the LAA SCell.

In some examples of the method, apparatus, and non-transitory computer-readable medium described above, identifying the downlink timing reference for the uplink transmission includes identifying the downlink timing reference for the uplink transmission based at least in part on a downlink transmission received over another LAA SCell that may be a member of the sTAG. In some examples of the method, apparatus, and non-transitory computer-readable medium described above, identifying the downlink timing reference for the uplink transmission includes identifying the downlink timing reference for the uplink transmission based at least in part on a most recently received downlink transmission received over an LAA SCell that may be a member of the sTAG.

Some examples of the method, apparatus, and non-transitory computer-readable medium described above may further include processes, features, means, or instructions for identifying a carrier-to-interference-and-noise ratio (CINR) associated with each of a plurality of LAA SCells that may be members of the sTAG. In some examples of the method, apparatus, and non-transitory computer-readable medium described above, the downlink timing reference may be identified based at least in part on the CINR of each of the plurality of LAA SCells.

Some examples of the method, apparatus, and non-transitory computer-readable medium described above may further include processes, features, means, or instructions for identifying a combined downlink timing reference based at least in part on downlink transmissions received over a plurality of LAA SCells that may be members of the sTAG, where the downlink timing reference may be identified based at least in part on the combined downlink timing reference. Some examples of the method, apparatus, and non-transitory computer-readable medium described above may further include processes, features, means, or instructions for identifying a CINR associated with each of the plurality of LAA SCells, where the combined downlink timing reference may be identified based at least in part on the CINR associated with each of the plurality of LAA SCells.

In some examples of the method, apparatus, and non-transitory computer-readable medium described above, the sTAG includes only the LAA SCell. In some examples of the method, apparatus, and non-transitory computer-readable medium described above, the sTAG includes a plurality of LAA SCells. In some examples of the method, apparatus, and non-transitory computer-readable medium described above, the PCell and LAA SCell may be geographically separated. In some examples of the method, apparatus, and non-transitory computer-readable medium described above, the PCell may be associated with a licensed carrier and the LAA SCell may be associated with an unlicensed carrier. In some examples of the method, apparatus, and non-transitory computer-readable medium described above, the uplink transmission includes a PUSCH transmission, a PUCCH transmission, or an SRS transmission.

DETAILED DESCRIPTION

Figure 1:
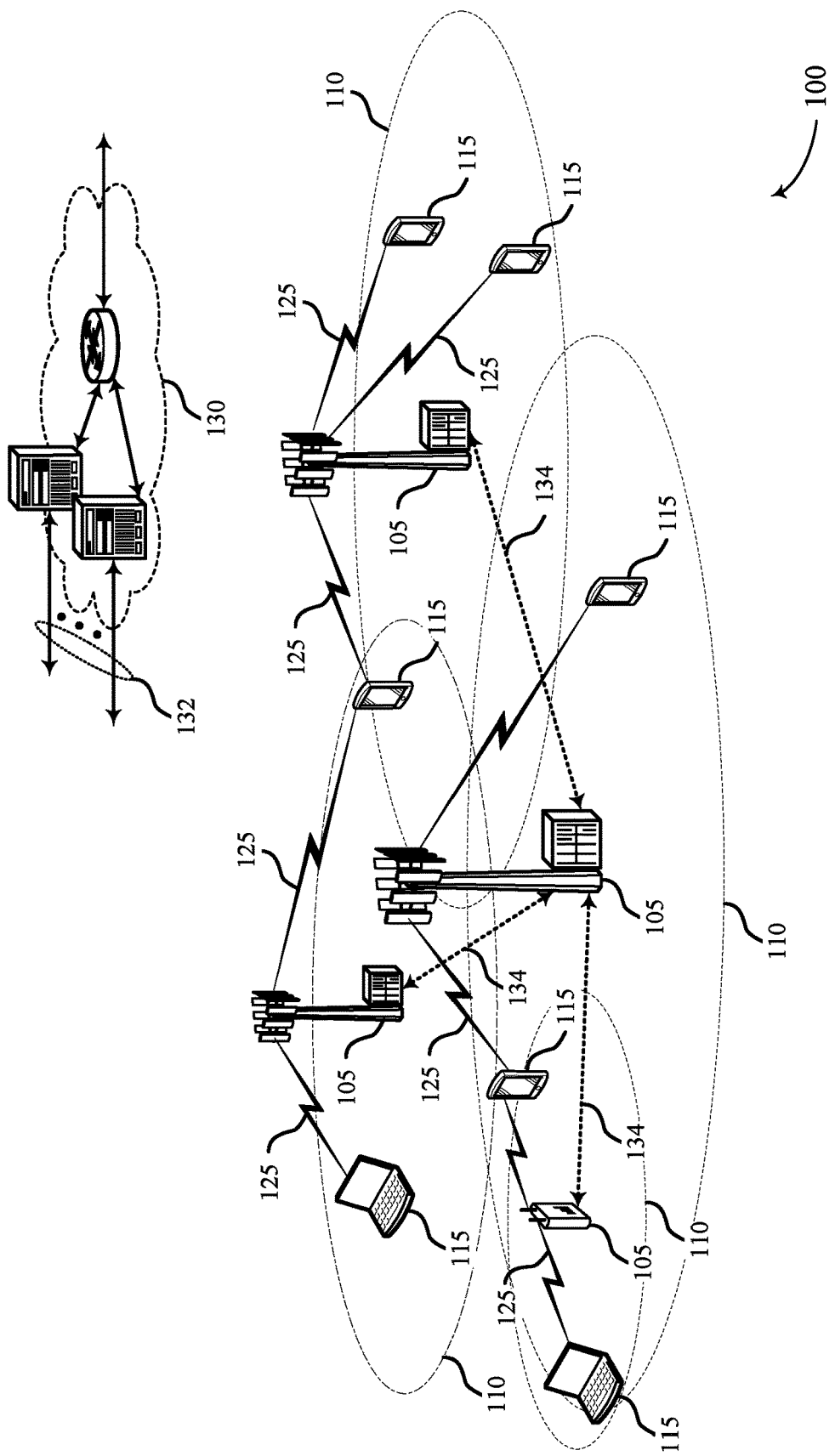
FIG. 1 illustrates an example of a wireless communications system that supports secondary timing advance groups (sTAGs) with only license assisted access (LAA) secondary cells (SCells) in accordance with various aspects of the present disclosure.

A wireless communications system may support wireless communication between a base station and a user equipment (UE). Specifically, a wireless communication system may support downlink transmissions from a base station to a UE and uplink transmissions from a UE to a base station. To reduce interference between uplink transmissions from multiple UEs, a wireless communications system may support techniques for aligning or synchronizing uplink transmissions from multiple UEs in the time domain. For example, a base station may coordinate with multiple UEs to ensure that uplink transmissions from the UEs are received by the base station at the same time (or approximately the same time).

To align or synchronize uplink transmissions from multiple UEs, a base station may configure a UE to transmit at a specific time based on a propagation delay associated with communication between the UE and a receiving cell at the base station. Specifically, the base station may communicate a timing advance (or negative offset) (i.e., determined based on the propagation delay) to the UE for the UE to use for uplink transmissions. The UE may then apply the timing advance (or negative offset) to a reference time in order to determine the appropriate timing for an uplink transmission. The reference time may be determined based on a downlink transmission received from the base station. Accordingly, uplink transmissions from multiple UEs may be received by the base station at the same time.

Because the number of timing advance values associated with communication between multiple UEs and multiple cells may be high, it may not be practical to maintain different timing advance values for each cell. Accordingly, a wireless system may utilize timing advance groups (TAGs) where multiple collocated cells share the same timing advance values. As such, a UE may receive timing advance information associated with a TAG rather than a specific cell. Additionally, the UE may determine the downlink timing reference for an uplink transmission over a cell in a TAG based on a downlink transmission received over any cell in the TAG.

In some examples, a TAG may include only cells associated with an unlicensed radio frequency spectrum band (e.g., license assisted access (LAA) secondary cells (SCells)). Such a TAG may be referred to as an LAA secondary TAG (sTAG). However, in some cases, a base station may not be able to win contention to the unlicensed spectrum to transmit over an LAA SCell, and downlink transmissions over the cells in the sTAG may not be guaranteed. As indicated above, a UE may not be able to identify the appropriate timing for an uplink transmission without a downlink timing reference, and the UE may not be able to determine the downlink timing reference without a downlink transmission. Therefore, when a base station is unable to transmit a downlink signal to a UE, the UE may be forced to suspend an uplink transmission, which may result in increased latency and reduced throughput in a wireless communication system.

As described herein, a wireless communications system may support efficient techniques for improving the likelihood that a UE is able to identify a downlink timing reference for an uplink transmission. Specifically, these techniques may provide for adding SCells to an LAA sTAG based on certain criteria to improve the chances of a UE receiving a downlink transmission over a cell in the LAA sTAG. In some cases, a base station may add an LAA SCell to an sTAG based on the scheduling carrier of a UE. If the LAA SCell is the scheduling carrier for the UE (i.e., self-scheduled), the base station may add the LAA SCell to the sTAG. If another carrier is the scheduling carrier for the UE (i.e., cross-carrier scheduled), the base station may add the LAA SCell to the sTAG based on a connected mode discontinuous reception (CDRX) status at a UE and the frequency of downlink transmissions over the LAA SCell. After receiving downlink transmissions over cells in an LAA sTAG, a UE may identify a downlink timing reference based on one or more of the downlink transmissions.

The techniques described herein may be used to improve the likelihood that a UE may receive a downlink transmission over an SCell in an sTAG to use to identify a downlink timing reference. In addition, these techniques may improve the accuracy of the downlink timing reference identified by the UE. Aspects of the disclosure introduced above are further described below with reference to a wireless communication system. These and other features are further illustrated by and then described with reference to apparatus diagrams, system diagrams, and flowcharts that relate to supporting sTAGs with only LAA SCells.

FIG. 1 illustrates an example of a wireless communications system 100 that supports sTAGs with only LAA SCells in accordance with various aspects of the present disclosure. The wireless communications system 100 includes base stations 105, UEs 115, and a core network 130. In some examples, the wireless communications system 100 may be a Long Term Evolution (LTE) (or LTE-Advanced) network, or a New Radio (NR) network. In some cases, wireless communications system 100 may support enhanced broadband communications, ultra-reliable (i.e., mission critical) communications, low latency communications, and communications with low-cost and low-complexity devices.

Base stations 105 may wirelessly communicate with UEs 115 via one or more base station antennas. Each base station 105 may provide communication coverage for a respective geographic coverage area 110. Communication links 125 shown in the wireless communications system 100 may include uplink transmissions from a UE 115 to a base station 105, or downlink transmissions from a base station 105 to a UE 115. Control information may be multiplexed on an uplink channel (e.g., physical uplink control channel (PUCCH)) or downlink channel (e.g., physical downlink control channel (PDCCH)) according to various techniques. Similarly, data may be multiplexed on an uplink channel (e.g., physical uplink shared channel (PUSCH)) or downlink channel (e.g., physical downlink shared channel (PDSCH)) according to various techniques. Control information and data may be multiplexed on a downlink channel, for example, using time division multiplexing (TDM) techniques, frequency division multiplexing (FDM) techniques, or hybrid TDM-FDM techniques.

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

A base station 105 may be connected by an S1 interface to the core network 130. The core network may be an evolved packet core (EPC), which may include at least one mobility management entity (MME), at least one serving gateway (S-GW), and at least one packet data network (PDN) gateway (P-GW). The MME may be the control node that processes the signaling between the UE 115 and the EPC. All user internet protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service (PSS).

The core network 130 may provide user authentication, access authorization, tracking, IP connectivity, and other access, routing, or mobility functions. At least some of the network devices, such as base station 105 may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

In some cases, a UE 115 may monitor a wireless link 125 continuously for an indication that the UE 115 may receive data. In other cases (e.g., to conserve power and extend battery life) a UE 115 may be configured with a discontinuous reception (DRX) cycle. A DRX cycle consists of an "On Duration" when the UE 115 may monitor for control information (e.g., on a PDCCH) and a "DRX period" when the UE 115 may power down radio components. UE 115 may be configured with a DRX cycle in idle mode (e.g., radio resource control (RRC) idle mode) and in connected mode (e.g., RRC connected mode). In idle mode DRX, UE 115 may be configured to listen for paging information discontinuously, whereas in CDRX, the UE 115 may be configured to listen for scheduling information (i.e., resource block allocation, modulation and coding scheme (MCS) configuration, etc.) for either a downlink or uplink transmission discontinuously.

The parameters associated with an idle mode DRX cycle may be different from the parameters associated with a CDRX cycle. A UE 115 in connected mode configured with a CDRX cycle may support a short DRX cycle and a long DRX cycle. In some cases, a UE 115 may enter a long DRX cycle if it is inactive for one or more short DRX cycles. The transition between the short DRX cycle, the long DRX cycle and continuous reception may be controlled by an internal timer or by messaging from a base station 105. A UE 115 may receive scheduling messages on a PDCCH during the "On Duration." While monitoring a PDCCH for a scheduling message, the UE 115 may initiate a "DRX Inactivity Timer." If a scheduling message is successfully received, the UE 115 may prepare to receive data and the DRX Inactivity Timer may be reset. When the DRX Inactivity Timer expires without receiving a scheduling message, the UE 115 may move into a short DRX cycle and may start a "DRX Short Cycle Timer". When the DRX Short Cycle Timer expires, the UE 115 may resume a long DRX cycle.

Wireless communications system 100 may support operation on multiple cells or carriers, a feature which may be referred to as carrier aggregation or multi-carrier operation. A carrier may also be referred to as a component carrier, a layer, a channel, etc. The terms "carrier," "component carrier," "cell," and "channel" may be used interchangeably herein. A component carrier may be a primary cell (PCell)

or an SCell. Both the PCell and SCell may be used to support communication with a UE 115. However, the PCell may be used for maintaining an RRC connection with the UE 115. A component carrier may be configured for use in an unlicensed spectrum or shared spectrum (where more than one operator is allowed to use the spectrum). In some cases, a UE 115 may be configured with multiple downlink component carriers and one or more uplink component carriers for carrier aggregation. Carrier aggregation may be used with both frequency division duplex (FDD) and time division duplex (TDD) component carriers. Multiple base stations 105 or cells may communicate with a UE 115 in a dual connectivity configuration in which component carriers are aggregated.

As indicated above, wireless communications system 100 may utilize both licensed and unlicensed radio frequency spectrum bands. For example, wireless communications system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. Operations in unlicensed spectrum may include downlink transmissions, uplink transmissions, or both. In some cases, operations in unlicensed bands may be based on a carrier aggregation configuration in conjunction with component carriers operating in a licensed band.

To reduce interference in wireless communications system 100, it may be appropriate to align or synchronize uplink transmissions from multiple UEs 115 to a base station 105 (e.g., in the time domain). Accordingly, UEs 115 at different geographic distances from a base station 105 may apply unique timing advance values (or negative offsets) to a reference time such that uplink transmissions from the UEs are received by the base station 105 at the same time. The timing advance value for a specific UE 115 may depend on the propagation delay associated with communication between the UE 115 and the base station 105, and the reference time may be determined based on a received downlink transmission (e.g., same for all UEs 115). Because the timing advance is based on a propagation delay associated with communication between a UE 115 and a base station 105, the uplink transmissions from multiple UEs may be aligned or synchronized in time.

Different timing advance values may be used to align uplink transmissions to geographically separated (or non-collocated) cells in wireless communications system 100. As a result, the number of timing advance values to be tracked by the network may be high, and it may not be practical to compute and communicate all these timing advance values. Accordingly, the wireless communications system 100 may support TAGs where the timing advance values associated with a group of cells are the same. The use of TAGs may help to reduce the number of timing advance values used to synchronize uplink transmissions in wireless communications system 100. A TAG that includes a PCell may be referred to as a primary TAG (pTAG) and a TAG that includes one or more SCells may be referred to as a secondary TAG (sTAG).

In some cases, a base station 105 may maintain an sTAG dedicated to LAA SCells. As discussed above, a UE may determine a timing reference for an uplink transmission based on a downlink transmission received from a base station. For wireless systems that utilize LAA sTAGs, the UE 115 may determine the timing reference for an uplink transmission based on a downlink transmission received over an SCell included in an LAA sTAG. That is, the reference time for an uplink transmission over an SCell included in an sTAG may be based on a downlink transmission over the corresponding SCell or over another SCell included in the sTAG.

In the case that all SCells in an sTAG are LAA SCells, however, a downlink transmission over an LAA SCell may not be guaranteed. Additionally, if CDRX is enabled at a UE 115, it may be appropriate for the UE 115 to reacquire a timing reference after a long CDRX cycle. However, the UE 115 may not receive a downlink transmission before a scheduled uplink transmission if the UE is configured to "wake up" just before the uplink transmission. Further, if the UE 115 is configured to "wake up" long before the uplink transmission to improve the chances of receiving a downlink transmission, the UE may consume additional power, thus defeating the purpose of CDRX at the UE.

Wireless communications system 100 may support efficient techniques for adding LAA SCells to an sTAG so that a UE 115 may be able to receive a downlink transmission to determine a timing reference for an uplink transmission. A base station 105 may determine the scheduling carrier over which scheduling information is provided to a UE for uplink transmissions, and the base station may add the SCell to the sTAG based on the determination of the scheduling carrier. If uplink transmissions from the UE are self-scheduled over the SCell, the base station may add the SCell to the sTAG. If uplink transmissions from the UE are cross-carrier scheduled over another cell, the base station 105 may consider further criteria before adding the SCell to the sTAG. After receiving downlink transmissions over cells included in the sTAG, the UE 115 may identify the downlink timing reference for an uplink transmission based on one or more of the downlink transmissions.

Figure 2:
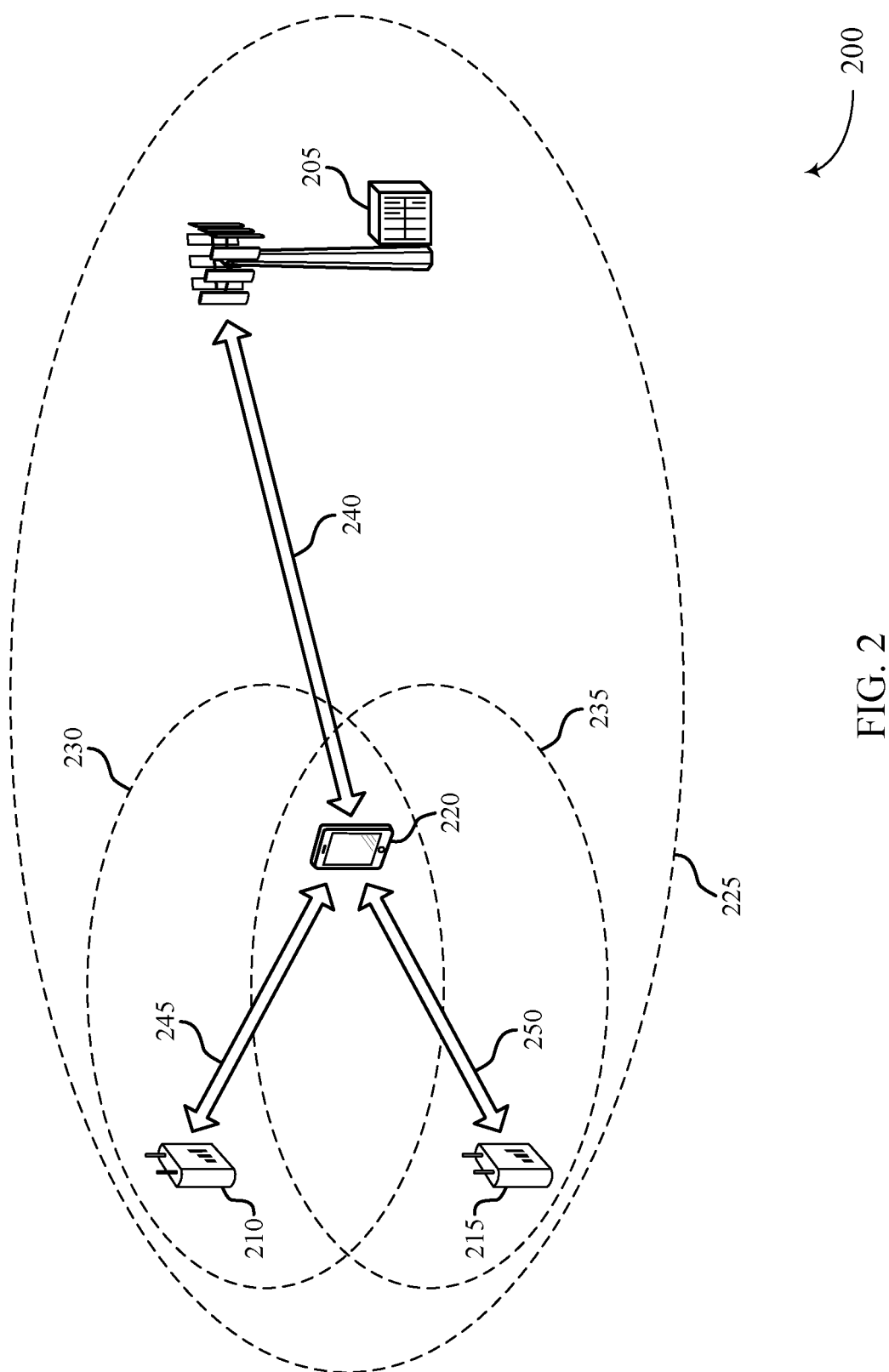
FIG. 2 illustrates an example of a wireless communications system that supports sTAGs with only LAA SCells in accordance with various aspects of the present disclosure.

FIG. 2 illustrates an example of a wireless communications system 200 that supports sTAGs with only LAA SCells in accordance with various aspects of the present disclosure. Wireless communications system 200 may include a PCell 205, an SCell 210, an SCell 215, and a UE 220, which may be examples of the corresponding devices described with reference to FIG. 1. PCell 205 may provide communication coverage for coverage area 225, SCell 210 may provide communication coverage for coverage area 230, and SCell 215 may provide communication coverage for coverage area 235. PCell 205 may communicate with UE 220 over a licensed carrier 240, SCell 210 may communicate with UE 220 over a first unlicensed carrier 245, and SCell 215 may communicate with UE 220 over a second unlicensed carrier 250. PCell 205 may be a macro cell, and SCells 210 and 215 may be small cells. In some cases, PCell 205 and SCell 210 may be associated with the same base station, and, in other cases, PCell 205 and SCell 210 may be associated with different base stations. SCell 215 may be associated with the same base station as SCell 210.

Wireless communications system 200 may support carrier aggregation using PCell 205 and SCells 210 and 215. As discussed with reference to FIG. 1, TAGs may be used to minimize the workload associated with computing and communicating timing advance values, while ensuring that uplink transmissions from multiple UEs are aligned or synchronized in time (i.e., received over a cell at the same time or approximately the same time). In some cases, an sTAG may be dedicated to LAA SCells (e.g., only include LAA SCells), and downlink transmissions over these cells may not be guaranteed. As a result, UE 220 may not receive a downlink transmission over a cell in the sTAG, and UE 220 may not be able to determine the appropriate timing for an uplink transmission. In such cases, the uplink transmission may be suspended, which may result in increased latency and reduced throughput in a wireless communication system.

Wireless communications system 200 may support efficient techniques for determining whether to add an SCell (e.g., SCells 210 and 215) to an LAA sTAG. These techniques may increase the chances of UE 220 receiving a downlink transmission over an SCell in the sTAG to use to identify a downlink timing reference for an uplink transmission over the SCell in the sTAG. For example, PCell 205 may determine whether to add SCell 210 to an LAA sTAG based on determining the scheduling carrier of UE 220 for uplink transmissions over SCell 210. Specifically, PCell 205 may determine whether to add SCell 210 to an LAA sTAG based on determining whether SCell 210 is the scheduling carrier used to provide scheduling information to UE 220 for uplink transmissions over the SCell 210 (i.e., self-scheduling). If PCell 205 determines that SCell 210 is the scheduling carrier for UE 220 for uplink transmissions over SCell 210, PCell 205 may add SCell 210 to the sTAG. In such cases, a downlink transmission over SCell 210 may be guaranteed since SCell 210 may be used to transmit a scheduling message to schedule the uplink transmission for UE 220. Accordingly, UE 220 may use this scheduling message to identify the downlink timing reference for the uplink transmission.

Alternatively, PCell 205 may determine to add SCell 210 to an LAA sTAG based on determining that another carrier is the scheduling carrier used to provide scheduling information to UE 220 for uplink transmissions over SCell 210 (i.e., cross carrier scheduling). In such cases, a downlink transmission over SCell 210 may not be guaranteed since UE 220 may receive a scheduling message over another carrier rather than over SCell 210. Accordingly, PCell 205 may analyze further criteria to determine whether to add SCell 210 to the LAA sTAG. For example, PCell 205 may determine a CDRX status of UE 220. If the CDRX status of UE 220 indicates that CDRX is not configured, PCell 205 may add SCell 210 to the LAA sTAG (e.g., since UE 220 may be more likely to receive a downlink transmission from SCell 210). Additionally or alternatively, PCell 205 may determine a traffic parameter associated with downlink transmissions over SCell 210. If the traffic parameter indicates that the frequency of downlink transmissions over SCell 210 is above a certain threshold (i.e., sufficient downlink transmissions), PCell 205 may add SCell 210 to the LAA sTAG (e.g., since UE 220 may be more likely to receive a downlink transmission from SCell 210). PCell 205 may also use the above techniques to determine whether to add SCell 215 to the LAA sTAG.

After receiving a downlink transmission over an SCell in an sTAG, UE 220 may determine the downlink timing reference for an uplink transmission. In some examples, the sTAG may include only SCell 210, and, in other examples, the sTAG may include multiple LAA SCells (e.g., SCells 210 and 215). In the example of FIG. 2, UE 220 may be scheduled to transmit the uplink transmission over SCell 210. Correspondingly, in some cases, UE 220 may identify the downlink timing reference based on a downlink transmission received over SCell 210. In other cases, an sTAG may include a main timing reference cell (e.g., SCell 210) and one or more secondary timing reference cells (e.g., SCell 215). If the timing accuracy associated with SCell 210 is deemed unreliable by UE 220, UE 220 may determine the downlink timing reference based on a downlink transmission over SCell 215. Otherwise, UE 220 may determine the downlink timing reference based on a downlink transmission received over SCell 210. In yet other cases, UE 220 may determine the downlink timing reference based on a most recently received downlink transmission over a cell in the LAA sTAG. In such cases, the downlink timing reference is updated after UE 220 receives a downlink transmission over any cell in the LAA sTAG.

In further examples, UE 220 may determine the downlink timing reference for an uplink transmission based on a comparison of the carrier-to-interference-and-noise ratios (CINRs) associated with the LAA SCells in an LAA sTAG. For instance, UE 220 may identify the downlink timing reference based on a downlink transmission received over the LAA SCell with the highest CINR. UE 220 may also determine the downlink timing reference for an uplink transmission based on a combination of downlink timing references determined based on downlink transmissions received over some or all of the SCells in an sTAG. The combined downlink timing reference may be determined based on a CINR-weight associated with each downlink transmission (e.g., using maximal ratio combining (MRC) techniques). Accordingly, the downlink timing reference may be more dependent on downlink transmissions over LAA SCells associated with higher CINR values. UE 220 may identify the downlink timing reference dynamically based on one or more of the techniques described above, or UE 220 may be configured (e.g., by a base station) to identify the downlink timing reference based on a specific technique described above, and, in some cases, based on a CDRX status of the UE 220.

In addition to the timing reference, it may be appropriate for UE 220 to identify the timing advance to determine the appropriate timing for the uplink transmission to SCell 210. UE 220 may receive timing advance information over PCell 205 based on the sTAG associated with SCell 210. UE 220 may then use the timing advance (i.e., negative offset) and a timing reference to determine the appropriate timing for the uplink transmission. If UE 220 cannot identify or maintain a reliable downlink timing reference for the uplink transmission, UE 220 may report the problem over PCell 205 (or any other licensed carrier), and UE 220 may suspend any uplink transmissions over SCell 210.

Figure 3:
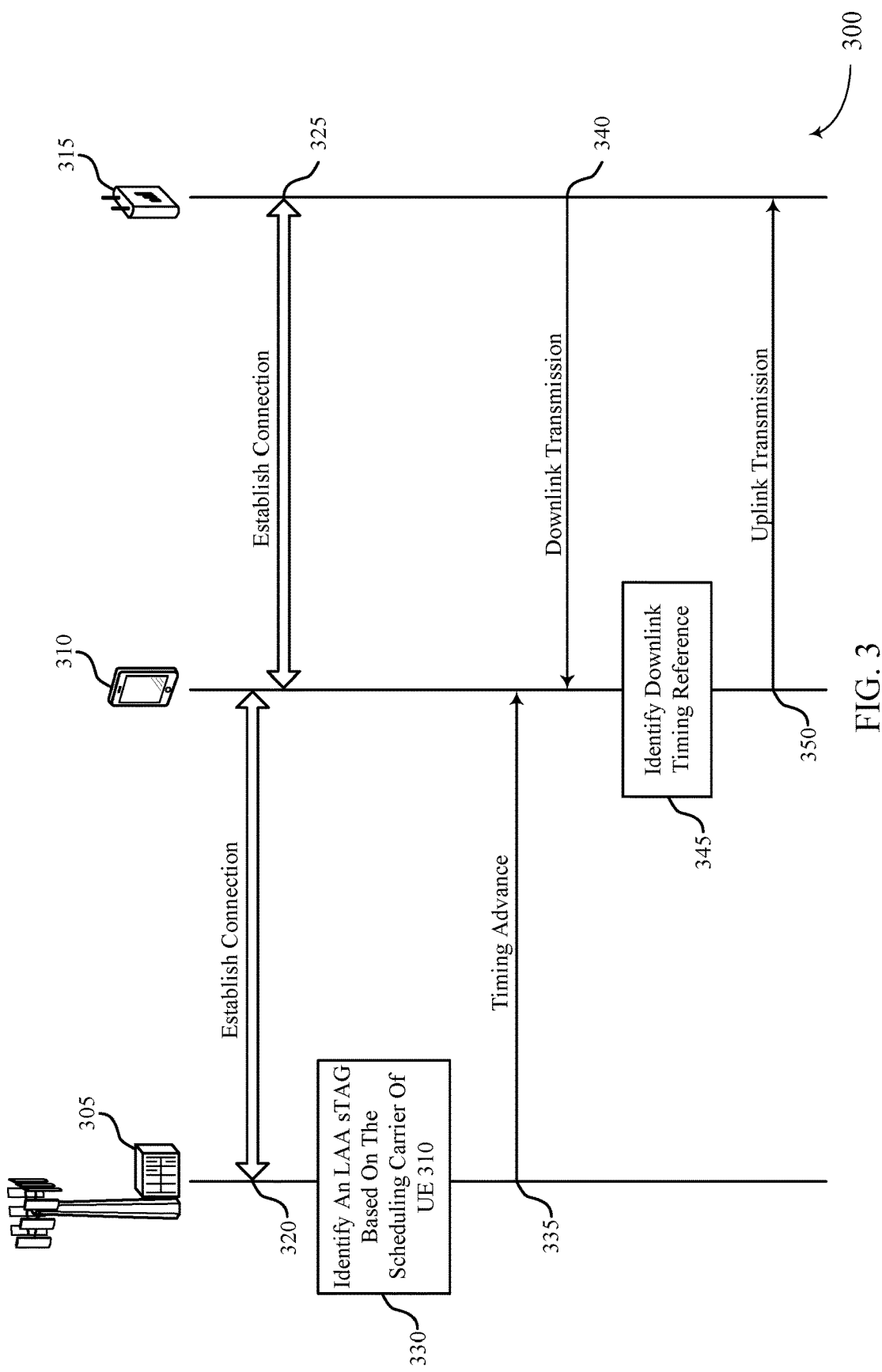
FIG. 3 illustrates an example of a process flow in a system that supports sTAGs with only LAA SCells in accordance with various aspects of the present disclosure.

FIG. 3 illustrates an example of a process flow 300 in a system that supports sTAGs with only LAA SCells in accordance with various aspects of the present disclosure. Process flow 300 illustrates aspects of techniques performed by a PCell 305, a UE 310, and an LAA SCell 315. PCell 305 may be an example of a cell at a base station 105 described with reference to FIG. 1 or a PCell 205 described with reference to FIG. 2. UE 310 may be an example of a UE 115 described with reference to FIG. 1 or a UE 220 described with reference to FIG. 2. LAA SCell 315 may be an example of a cell at a base station 105 described with reference to FIG. 1 or one of SCells 210 or 215 described with reference to FIG. 2. Thus, the operations and signaling described below may be performed by a base station (or cell) 105 or a UE 115 described with reference to FIG. 1, or a PCell 205, SCell 210, SCell 215, or UE 220 described with reference to FIG. 2.

As illustrated, PCell 305 may establish a connection 320 with UE 310, and LAA SCell 315 may establish a connection 325 with UE 310. In some cases, uplink transmissions from UE 310 over LAA SCell 315 may be self-scheduled over LAA SCell 315. That is, LAA SCell 315 may be the scheduling carrier for UE 310 for uplink transmissions over LAA SCell 315 and may be used to provide scheduling information to UE 310 for uplink transmissions over LAA SCell 315. In other cases, uplink transmissions from UE 310 over LAA SCell 315 may be cross-carrier scheduled over PCell 305. That is, PCell 305 may be the scheduling carrier for UE 310 for uplink transmissions over LAA SCell 315 and may be used to provide scheduling information to UE 310 for uplink transmissions over LAA SCell 315.

PCell 305 may be an example of a macro cell and may be associated with a licensed frequency spectrum band, and LAA SCell 315 may be an example of a small cell and may be associated with an unlicensed frequency spectrum band. A base station may be connected to UE 310 in an LAA mode using PCell 305 and LAA SCell 315. An LAA mode may represent a connection to a UE using a licensed carrier and an unlicensed carrier. In some cases, PCell 305 and LAA SCell 315 may be geographically separated (i.e., non-collocated). In some examples, the PCell 305 (e.g., licensed carrier) may be associated with a first base station and the LAA SCell 315 (e.g., unlicensed carrier) may be associated with a second base station.

At 330, PCell 305 may identify an LAA sTAG based on the scheduling carrier of UE 310 for uplink transmissions over SCells (e.g., SCell 315). A TAG that includes PCell 305 may be referred to as a pTAG, and a TAG that includes only LAA SCells may be referred to as an LAA sTAG. PCell 305 may be a member of a pTAG and may determine whether to include LAA SCell 315 in an LAA sTAG. For instance, PCell 305 may determine the scheduling carrier over which scheduling information is provided to UE 310 for uplink transmissions from UE 310 over LAA SCell 315, and PCell 305 may add LAA SCell 315 to an LAA sTAG based on the shared radio frequency spectrum band of LAA SCell 315 and the determination of the scheduling carrier.

In some cases, PCell 305 may identify LAA SCell 315 as the scheduling carrier for uplink transmissions from UE 310 over LAA SCell 315, and PCell 305 may add LAA SCell 315 to the sTAG based on the identification of LAA SCell 315 as the scheduling carrier. In other cases, PCell 305 may identify a carrier other than LAA SCell 315 as the scheduling carrier for uplink transmissions from UE 310 over LAA SCell 315 (e.g., PCell 305). In such cases, PCell 305 may obtain, based on identifying the carrier other than the LAA SCell 315 as the scheduling carrier, a CDRX status of UE 310, and PCell 305 may add LAA SCell 315 to the sTAG if the CDRX status indicates that CDRX is not configured for UE 310. Additionally or alternatively, PCell 305 may obtain, based on identifying the carrier other than the LAA SCell 315 as the scheduling carrier, a traffic parameter for downlink transmissions to UE 310 over LAA SCell 315, and PCell 305 may add LAA SCell 315 to the sTAG based on the traffic parameter (e.g., if downlink traffic over LAA SCell 315 is above a certain threshold). The sTAG may include only the LAA SCell or a plurality of LAA SCells.

PCell 305 may transmit an indication of a timing advance 335 (e.g., timing advance information) for UE 115 to use for an uplink transmission over LAA SCell 315, where the timing advance 335 is the same for all cells in an sTAG that includes LAA SCell 315. The timing advance 335 may correspond to a negative offset that UE 310 may apply to a reference time in order to determine the timing of the uplink transmission. At 345, UE 310 may then determine the reference time to use in combination with the timing advance 335 to determine the appropriate timing of an uplink transmission over LAA SCell 315. In some cases, UE 310 may receive a downlink transmission 340, and UE 310 may determine the reference time based on the downlink transmission 340. The downlink transmission 340 may be a PDSCH transmission, PDCCH transmission, or a cell-specific reference signal (CRS) transmission.

In some cases, the downlink transmission 340 used to determine the downlink timing reference may be received over LAA SCell 315 (e.g., an uplink grant used to schedule the uplink transmission). In other cases, the downlink transmission 340 used to determine the downlink timing reference may be received from another LAA SCell in the sTAG that includes LAA SCell 315. In some examples, the downlink transmission 340 used to determine the downlink timing reference may be a most recently received downlink transmission over an LAA SCell in the sTAG that includes LAA SCell 315. In other examples, the downlink transmission 340 used to determine the downlink timing reference may be a downlink transmission received over the LAA SCell in the sTAG associated with the highest CINR value.

In yet other examples, UE 310 may determine a combined downlink timing reference (e.g., as the downlink timing reference time) based on multiple downlink transmissions (e.g., including downlink transmission 340) received over multiple LAA SCells in the sTAG that includes LAA SCell 315. In such examples, the combined downlink timing reference may be determined based on the CINR associated with each of the multiple LAA SCells. UE 310 may then transmit the uplink transmission 350 over LAA SCell 315 based on the downlink timing reference identified based on downlink transmission 340 and the received timing advance 335. The uplink transmission 350 may be a PUSCH transmission, PUCCH transmission, or an SRS transmission (e.g., used for channel quality estimation).

Figure 4:
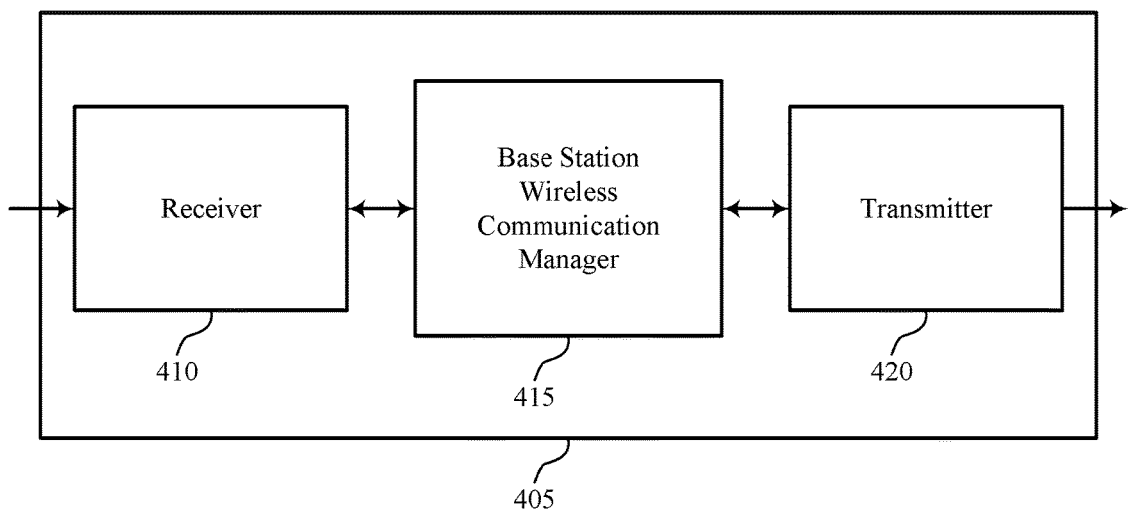
FIGS. 4-6 show block diagrams of a device or devices that support sTAGs with only LAA SCells in accordance with various aspects of the present disclosure.

FIG. 4 shows a block diagram 400 of a wireless device 405 that supports sTAGs with only LAA SCells in accordance with various aspects of the present disclosure. Wireless device 405 may be an example of aspects of a base station 105 as described with reference to FIG. 1. Wireless device 405 may include receiver 410, base station wireless communication manager 415, and transmitter 420. Wireless device 405 may also include a processor. Each of these components may be in communication with one another (e.g., via one or more buses).

Receiver 410 may receive information such as packets, user data, or control information associated with various information channels (e.g., control channels, data channels, and information related to sTAGs with only LAA SCells, etc.). Information may be passed on to other components of the device. The receiver 410 may be an example of aspects of the transceiver 735 described with reference to FIG. 7.

Base station wireless communication manager 415 may be an example of aspects of the base station wireless communication manager 715 described with reference to FIG. 7. Base station wireless communication manager 415 and/or at least some of its various sub-components may be implemented in hardware, software executed by a processor, firmware, or any combination thereof. If implemented in software executed by a processor, the functions of the base station wireless communication manager 415 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The base station wireless communication manager 415 and/or at least some of its various sub-components may be physically located at various positions, including being distributed such that portions of functions are implemented at different physical locations by one or more physical devices. In some examples, base station wireless communication manager 415 and/or at least some of its various sub-components may be a separate and distinct component in accordance with various aspects of the present disclosure. In other examples, base station wireless communication manager 415 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station wireless communication manager 415 may connect to a UE in an LAA mode using a PCell and an SCell associated with a shared radio frequency spectrum band, determine a scheduling carrier over which scheduling information is provided to the UE for uplink transmissions from the UE over the SCell, and add the SCell to an sTAG based on the shared radio frequency spectrum band of the SCell and the determination of the scheduling carrier. Base station wireless communication manager 415, in combination with transmitter 420, may then transmit timing advance information associated with the sTAG to the UE for uplink transmissions over the SCell.

Transmitter 420 may transmit signals generated by other components of the device. In some examples, the transmitter 420 may be collocated with a receiver 410 in a transceiver module. For example, the transmitter 420 may be an example of aspects of the transceiver 735 described with reference to FIG. 7. The transmitter 420 may include a single antenna, or it may include a set of antennas.

Figure 5:
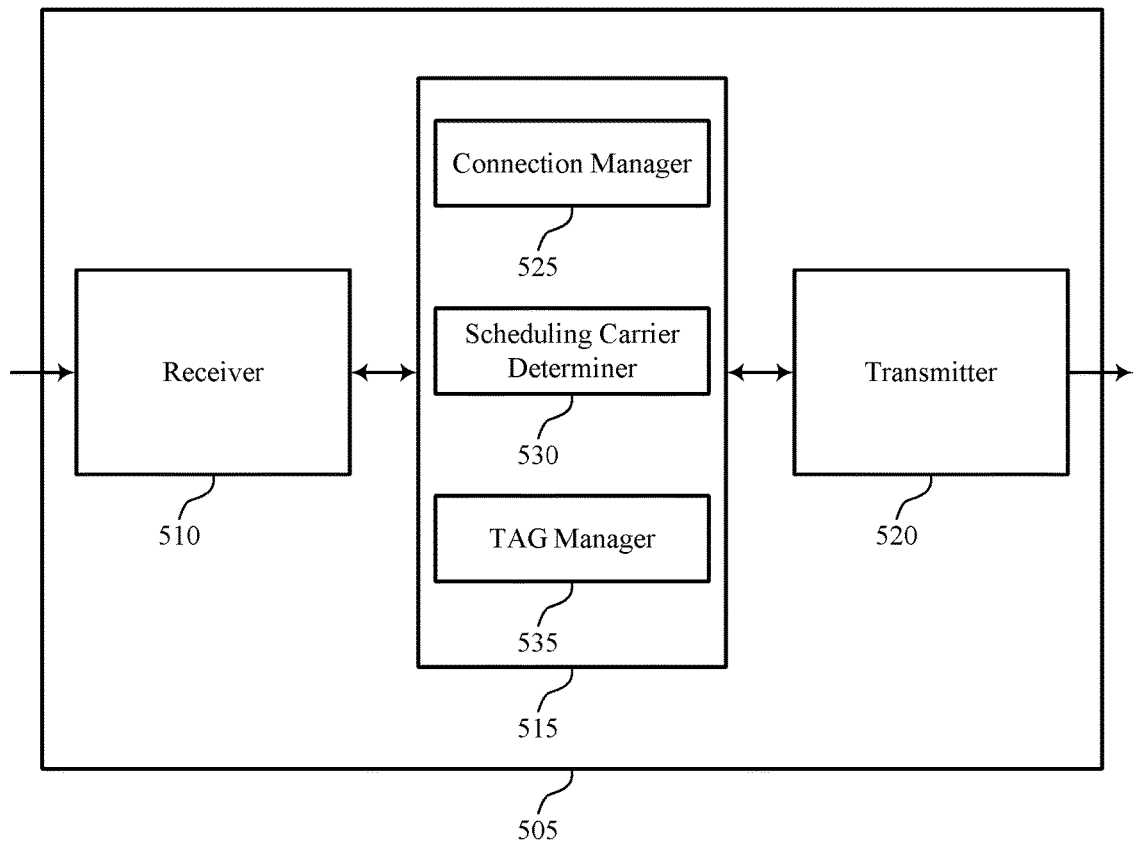

FIG. 5 shows a block diagram 500 of a wireless device 505 that supports sTAGs with only LAA SCells in accordance with various aspects of the present disclosure. Wireless device 505 may be an example of aspects of a wireless device 405 or a base station 105 as described with reference to FIGS. 1 and 4. Wireless device 505 may include receiver 510, base station wireless communication manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to sTAGs with only LAA SCells, etc.). Information may be passed on to other components of the device. The receiver 510 may be an example of aspects of the transceiver 735 described with reference to FIG. 7.

Base station wireless communication manager 515 may be an example of aspects of the base station wireless communication manager 715 described with reference to FIG. 7. Base station wireless communication manager 515 may include connection manager 525, scheduling carrier determiner 530, and TAG manager 535.

Connection manager 525 may connect to a UE in an LAA mode using a PCell and an SCell associated with a shared radio frequency spectrum band. In some cases, the PCell and SCell may be geographically separated. In some cases, the PCell may be associated with a licensed carrier and the SCell may be associated with an unlicensed carrier. Scheduling carrier determiner 530 may determine a scheduling carrier over which scheduling information is provided to the UE for uplink transmissions from the UE over the SCell. In some cases, determining the scheduling carrier includes identifying the SCell as the scheduling carrier or identifying a carrier other than the SCell as the scheduling carrier. In some cases, the uplink transmissions include PUSCH transmissions, PUCCH transmissions, or SRS transmissions.

TAG manager 535 may add the SCell to an sTAG based on the shared radio frequency spectrum band of the SCell and the determination of the scheduling carrier. In some cases, the SCell is added to the sTAG based on the identification of the SCell as the scheduling carrier. In some cases, the CDRX status may indicate that CDRX is not configured for the UE and the SCell may be added to the sTAG based on the CDRX status. In some cases, the SCell may be added to the sTAG based on a traffic parameter. In some cases, the sTAG may include only LAA SCells. Base station wireless communication manager 515, in combination with transmitter 520, may then transmit timing advance information associated with the sTAG to the UE for uplink transmissions over the SCell.

Transmitter 520 may transmit signals generated by other components of the device. In some examples, the transmitter 520 may be collocated with a receiver 510 in a transceiver module. For example, the transmitter 520 may be an example of aspects of the transceiver 735 described with reference to FIG. 7. The transmitter 520 may include a single antenna, or it may include a set of antennas.

Figure 6:
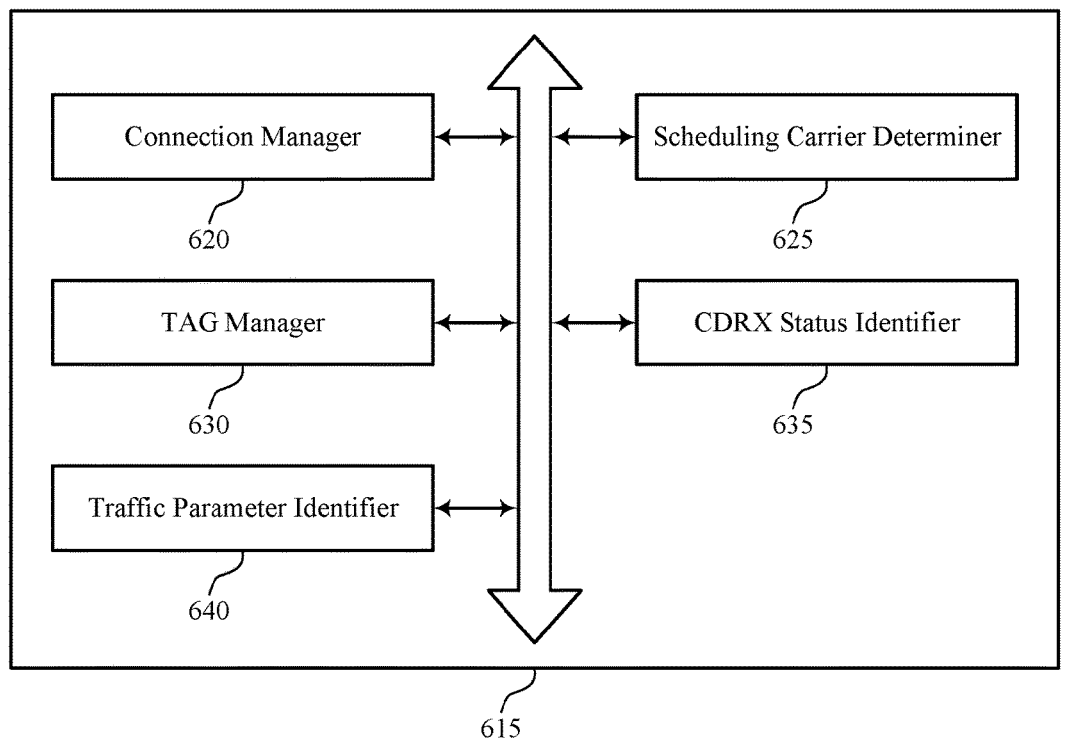

FIG. 6 shows a block diagram 600 of a base station wireless communication manager 615 that supports sTAGs with only LAA SCells in accordance with various aspects of the present disclosure. The base station wireless communication manager 615 may be an example of aspects of a base station wireless communication manager 415, a base station wireless communication manager 515, or a base station wireless communication manager 715 described with reference to FIGS. 4, 5, and 7. The base station wireless communication manager 615 may include connection manager 620, scheduling carrier determiner 625, TAG manager 630, CDRX status identifier 635, and traffic parameter identifier 640. Each of these modules may communicate, directly or indirectly, with one another (e.g., via one or more buses).

Connection manager 620 may connect to a UE in an LAA mode using a PCell and an SCell associated with a shared radio frequency spectrum band. In some cases, the PCell and SCell may be geographically separated. In some cases, the PCell may be associated with a licensed carrier and the SCell may be associated with an unlicensed carrier. Scheduling carrier determiner 625 may determine a scheduling carrier over which scheduling information is provided to the UE for uplink transmissions from the UE over the SCell. In some cases, determining the scheduling carrier includes identifying the SCell as the scheduling carrier or identifying a carrier other than the SCell as the scheduling carrier. In some cases, the uplink transmissions may include PUSCH transmissions, PUCCH transmissions, or SRS transmissions.

TAG manager 630 may add the SCell to an sTAG based on the shared radio frequency spectrum band of the SCell and the determination of the scheduling carrier. In some cases, the SCell may be added to the sTAG based on the identification of the SCell as the scheduling carrier. CDRX status identifier 635 may obtain, based on identifying the carrier other than the SCell as the scheduling carrier, a CDRX status of the UE. In some cases, the CDRX status may indicate that CDRX is not configured for the UE and the SCell may be added to the sTAG based on the CDRX status. Traffic parameter identifier 640 may obtain, based on identifying the carrier other than the SCell as the scheduling carrier, a traffic parameter for downlink transmissions to the UE over the SCell. In some cases, the SCell may be added to the sTAG based on the traffic parameter. In some cases, the sTAG may include only LAA SCells. Base station wireless communication manager 615, in combination with a transmitter, may then transmit timing advance information associated with the sTAG to the UE for uplink transmissions over the SCell.

Figure 7:
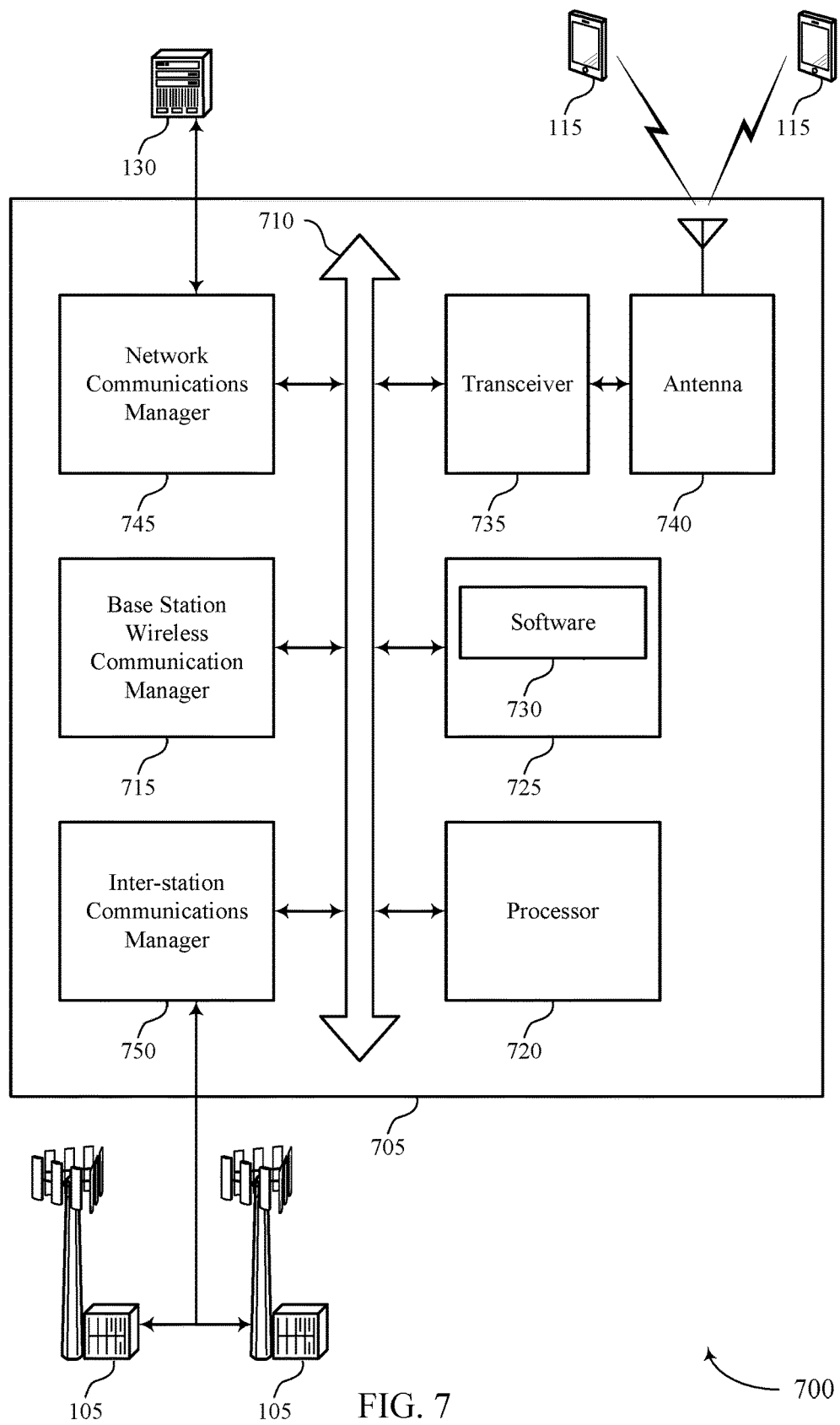
FIG. 7 illustrates a block diagram of a system including a base station that supports sTAGs with only LAA SCells in accordance with various aspects of the present disclosure.

FIG. 7 shows a diagram of a system 700 including a device 705 that supports sTAGs with only LAA SCells in accordance with various aspects of the present disclosure. Device 705 may be an example of or include the components of wireless device 405, wireless device 505, or a base station 105 as described above, e.g., with reference to FIGS. 1, 4 and 5. Device 705 may include components for bi-directional voice and data communications including components for transmitting and receiving communications, including base station wireless communication manager 715, processor 720, memory 725, software 730, transceiver 735, antenna 740, network communications manager 745, and inter-station communications manager 750. These components may be in electronic communication via one or more busses (e.g., bus 710). Device 705 may communicate wirelessly with one or more UEs 115.

Processor 720 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 720 may be configured to operate a memory array using a memory controller. In other cases, a memory controller may be integrated into processor 720. Processor 720 may be configured to execute computer-readable instructions stored in a memory to perform various functions (e.g., functions or tasks supporting sTAGs with only LAA SCells).

Memory 725 may include random access memory (RAM) and read only memory (ROM). The memory 725 may store computer-readable, computer-executable software 730 including instructions that, when executed, cause the processor to perform various functions described herein. In some cases, the memory 725 may contain, among other things, a basic input/output system (BIOS) which may control basic hardware and/or software operation such as the interaction with peripheral components or devices.

Software 730 may include code to implement aspects of the present disclosure, including code to support sTAGs with only LAA SCells. Software 730 may be stored in a non-transitory computer-readable medium such as system memory or other memory. In some cases, the software 730 may not be directly executable by the processor but may cause a computer (e.g., when compiled and executed) to perform functions described herein.

Transceiver 735 may communicate bi-directionally, via one or more antennas, wired, or wireless links as described above. For example, the transceiver 735 may represent a wireless transceiver and may communicate bi-directionally with another wireless transceiver. The transceiver 735 may also include a modem to modulate the packets and provide the modulated packets to the antennas for transmission, and to demodulate packets received from the antennas. In some cases, the wireless device may include a single antenna 740. However, in other cases, the device may have more than one antenna 740, which may be capable of concurrently transmitting or receiving multiple wireless transmissions.

Network communications manager 745 may manage communications with the core network (e.g., via one or more wired backhaul links). For example, the network communications manager 745 may manage the transfer of data communications for client devices, such as one or more UEs 115.

Inter-station communications manager 750 may manage communications with other base station 105, and may include a controller or scheduler for controlling communications with UEs 115 in cooperation with other base stations 105. For example, the inter-station communications manager 750 may coordinate scheduling for transmissions to UEs 115 for various interference mitigation techniques such as beamforming or joint transmission. In some examples, inter-station communications manager 750 may provide an X2 interface within an LTE/LTE-A wireless communication network to provide communication between base stations 105.

Figure 8:
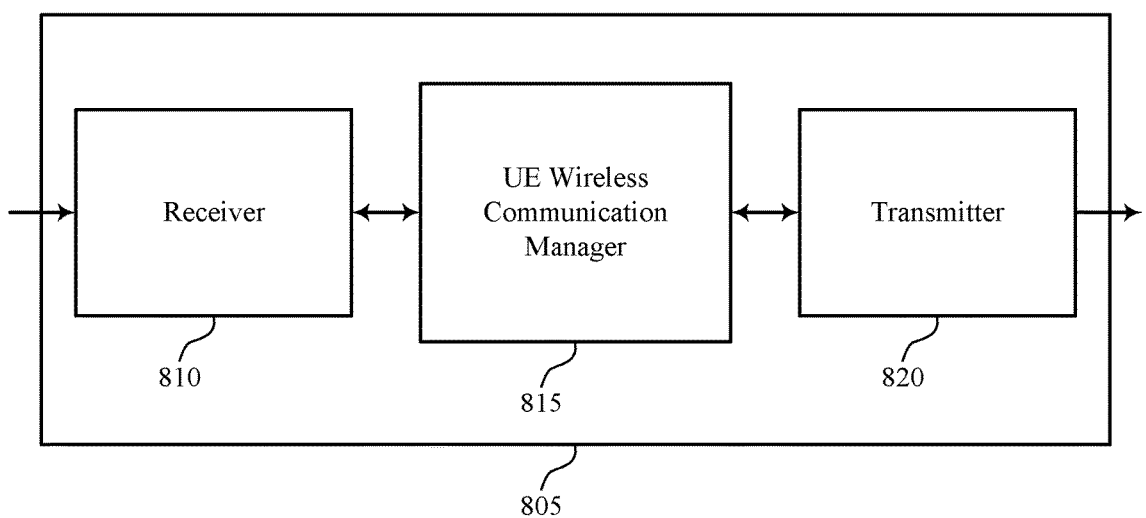
FIGS. 8-10 show block diagrams of a device or devices that support sTAGs with only LAA SCells in accordance with various aspects of the present disclosure.

FIG. 8 shows a block diagram 800 of a wireless device 805 that supports sTAGs with only LAA SCells in accordance with various aspects of the present disclosure. Wireless device 805 may be an example of aspects of a UE 115 as described with reference to FIG. 1. Wireless device 805 may include receiver 810, UE wireless communication manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to sTAGs with only LAA SCells, etc.). Information may be passed on to other components of the device. The receiver 810 may be an example of aspects of the transceiver 1135 described with reference to FIG. 11.

UE wireless communication manager 815 may be an example of aspects of the UE wireless communication manager 1115 described with reference to FIG. 11. UE wireless communication manager 815 and/or at least some of its various sub-components may be implemented in hardware, software executed by a processor, firmware, or any combination thereof. If implemented in software executed by a processor, the functions of the UE wireless communication manager 815 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The UE wireless communication manager 815 and/or at least some of its various sub-components may be physically located at various positions, including being distributed such that portions of functions are implemented at different physical locations by one or more physical devices. In some examples, UE wireless communication manager 815 and/or at least some of its various sub-components may be a separate and distinct component in accordance with various aspects of the present disclosure. In other examples, UE wireless communication manager 815 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE wireless communication manager 815 may connect to a base station in an LAA mode using a PCell and an LAA SCell associated with a shared radio frequency spectrum band. UE wireless communication manager 815, in combination with receiver 810, may receive timing advance information associated with an sTAG dedicated to LAA SCells, where the LAA SCell is a member of the sTAG. In some cases, the sTAG may include only the LAA SCell. In other cases, the sTAG may include a set of LAA SCells. UE wireless communication manager 815 may then identify a downlink timing reference for an uplink transmission over the LAA SCell, and UE wireless communication manager 815, in combination with transmitter 820, may transmit the uplink transmission over the LAA SCell based on the identified downlink timing reference and the received timing advance information. In some cases, the uplink transmission may include a PUSCH transmission, a PUCCH transmission, or an SRS transmission.

Transmitter 820 may transmit signals generated by other components of the device. In some examples, the transmitter 820 may be collocated with a receiver 810 in a transceiver module. For example, the transmitter 820 may be an example of aspects of the transceiver 1135 described with reference to FIG. 11. The transmitter 820 may include a single antenna, or it may include a set of antennas.

Figure 9:
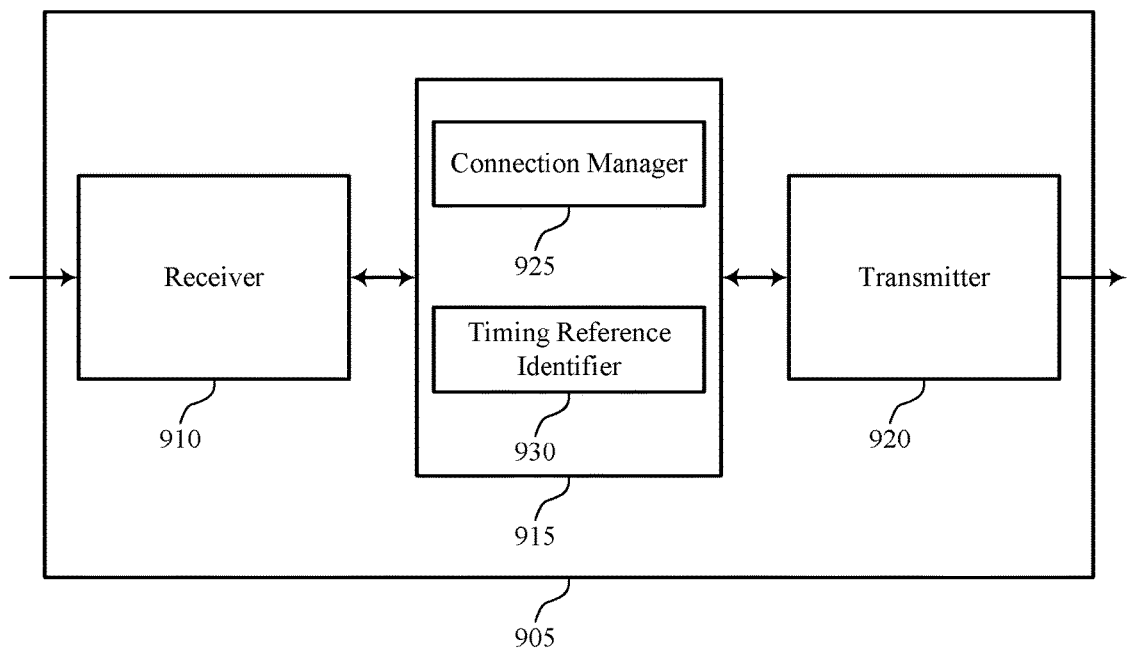

FIG. 9 shows a block diagram 900 of a wireless device 905 that supports sTAGs with only LAA SCells in accordance with various aspects of the present disclosure. Wireless device 905 may be an example of aspects of a wireless device 805 or a UE 115 as described with reference to FIGS. 1 and 8. Wireless device 905 may include receiver 910, UE wireless communication manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to sTAGs with only LAA SCells, etc.). Information may be passed on to other components of the device. The receiver 910 may be an example of aspects of the transceiver 1135 described with reference to FIG. 11.

UE wireless communication manager 915 may be an example of aspects of the UE wireless communication manager 1115 described with reference to FIG. 11. UE wireless communication manager 915 may include connection manager 925 and timing reference identifier 930.

Connection manager 925 may connect to a base station in an LAA mode using a PCell and an LAA SCell associated with a shared radio frequency spectrum band. In some cases, the PCell and LAA SCell may be geographically separated. In some cases, the PCell may be associated with a licensed carrier and the LAA SCell may be associated with an unlicensed carrier. UE wireless communication manager 915, in combination with receiver 910, may receive timing advance information associated with an sTAG dedicated to LAA SCells, where the LAA SCell is a member of the sTAG. In some cases, the sTAG may include only the LAA SCell. In other cases, the sTAG may include a set of LAA SCells.

Timing reference identifier 930 may identify a downlink timing reference for an uplink transmission over the LAA SCell. In some cases, identifying the downlink timing reference for the uplink transmission includes identifying the downlink timing reference for the uplink transmission based on a downlink transmission received over the LAA SCell or another LAA SCell that is a member of the sTAG. In some cases, identifying the downlink timing reference for the uplink transmission includes identifying the downlink timing reference for the uplink transmission based on a most recently received downlink transmission received over an LAA SCell that is a member of the sTAG.

UE wireless communication manager 915, in combination with transmitter 920, may then transmit the uplink transmission over the LAA SCell based on the identified downlink timing reference and the received timing advance information. In some cases, the uplink transmission may include a PUSCH transmission, a PUCCH transmission, or an SRS transmission.

Transmitter 920 may transmit signals generated by other components of the device. In some examples, the transmitter 920 may be collocated with a receiver 910 in a transceiver module. For example, the transmitter 920 may be an example of aspects of the transceiver 1135 described with reference to FIG. 11. The transmitter 920 may include a single antenna, or it may include a set of antennas.

Figure 10:
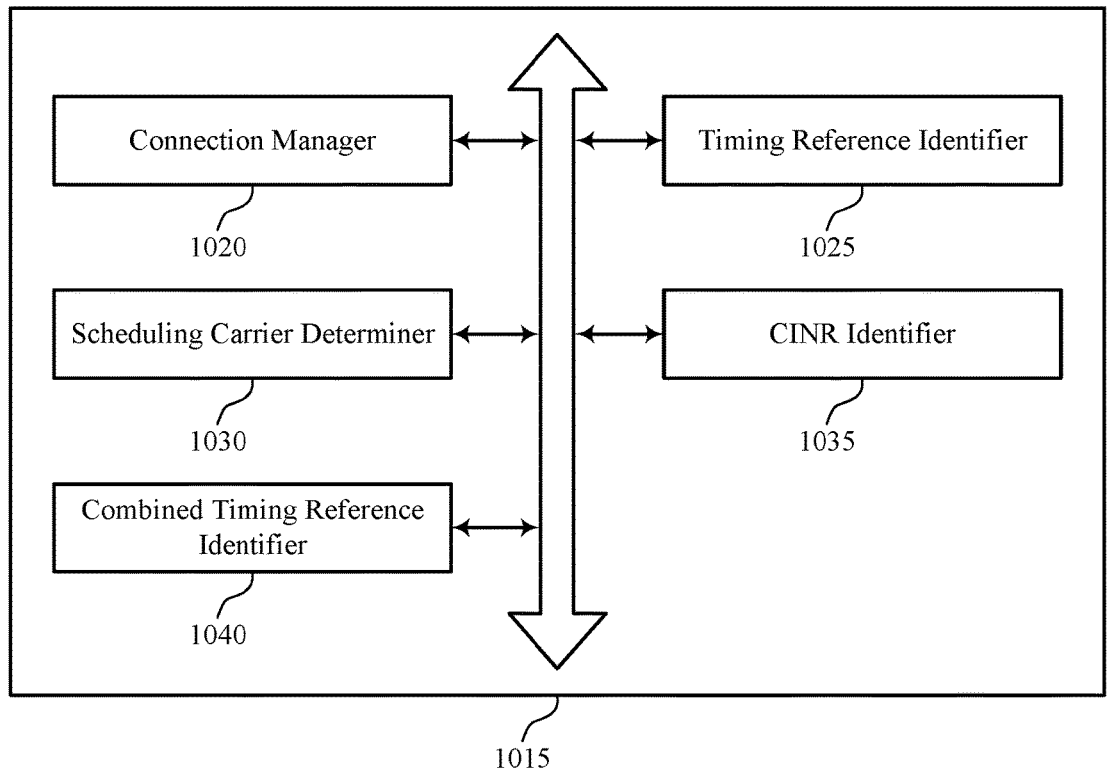

FIG. 10 shows a block diagram 1000 of a UE wireless communication manager 1015 that supports sTAGs with only LAA SCells in accordance with various aspects of the present disclosure. The UE wireless communication manager 1015 may be an example of aspects of a UE wireless communication manager 815, a UE wireless communication manager 915, or a UE wireless communication manager 1115 described with reference to FIGS. 8, 9, and 11. The UE wireless communication manager 1015 may include connection manager 1020, timing reference identifier 1025, scheduling carrier determiner 1030, CINR identifier 1035, and combined timing reference identifier 1040. Each of these modules may communicate, directly or indirectly, with one another (e.g., via one or more buses).

Connection manager 1020 may connect to a base station in an LAA mode using a PCell and an LAA SCell associated with a shared radio frequency spectrum band. In some cases, the PCell and LAA SCell may be geographically separated. In some cases, the PCell may be associated with a licensed carrier and the LAA SCell may be associated with an unlicensed carrier. UE wireless communication manager 1015, in combination with a receiver, may receive timing advance information associated with an sTAG dedicated to LAA SCells, where the LAA SCell is a member of the sTAG. In some cases, the sTAG may include only the LAA SCell. In other cases, the sTAG may include a set of LAA SCells.

Timing reference identifier 1025 may identify a downlink timing reference for an uplink transmission over the LAA SCell. In some cases, scheduling carrier determiner 1030 may determine a scheduling carrier over which scheduling information is provided to the UE for uplink transmissions from the UE over the LAA SCell, and the downlink timing reference for the uplink transmission may be identified based on the determination of the scheduling carrier. In some cases, identifying the downlink timing reference for the uplink transmission includes identifying the downlink timing reference for the uplink transmission based on a downlink transmission received over the LAA SCell or over another LAA SCell that is a member of the sTAG.

In some cases, identifying the downlink timing reference for the uplink transmission includes identifying the downlink timing reference for the uplink transmission based on a most recently received downlink transmission received over an LAA SCell that is a member of the sTAG. In some cases, CINR identifier 1035 may identify a CINR associated with each of a set of LAA SCells that are members of the sTAG, and the downlink timing reference may be identified based on the CINR of each of the set of LAA SCells. In some cases, combined timing reference identifier 1040 may identify a combined downlink timing reference based on downlink transmissions received over a set of LAA SCells that are members of the sTAG, and the downlink timing reference may be identified based on the combined downlink timing reference. In some cases, the combined downlink timing reference is identified based on the CINR associated with each of the set of LAA SCells.

UE wireless communication manager 1015, in combination with a transmitter, may then transmit the uplink transmission over the LAA SCell based on the identified downlink timing reference and the received timing advance information. In some cases, the uplink transmission may include a PUSCH transmission, a PUCCH transmission, or an SRS transmission.

Figure 11:
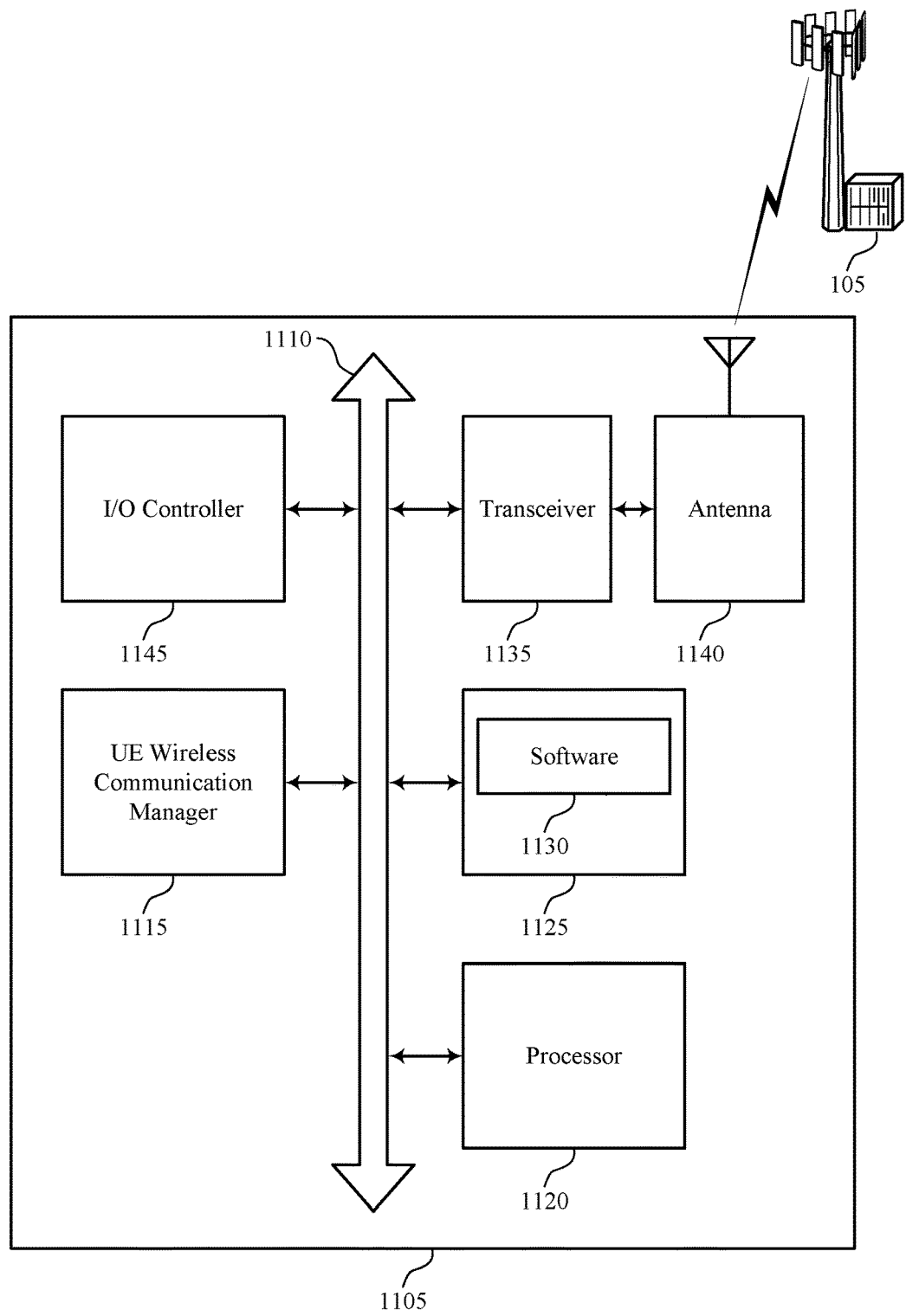
FIG. 11 illustrates a block diagram of a system including a user equipment (UE) that supports sTAGs with only LAA SCells in accordance with various aspects of the present disclosure.

FIG. 11 shows a diagram of a system 1100 including a device 1105 that supports sTAGs with only LAA SCells in accordance with various aspects of the present disclosure. Device 1105 may be an example of or include the components of UE 115 as described above, e.g., with reference to FIG. 1. Device 1105 may include components for bi-directional voice and data communications including components for transmitting and receiving communications, including UE wireless communication manager 1115, processor 1120, memory 1125, software 1130, transceiver 1135, antenna 1140, and I/O controller 1145. These components may be in electronic communication via one or more busses (e.g., bus 1110). Device 1105 may communicate wirelessly with one or more base stations 105.

Processor 1120 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting sTAGs with only LAA SCells).

Memory 1125 may include RAM and ROM. The memory 1125 may store computer-readable, computer-executable software 1130 including instructions that, when executed, cause the processor to perform various functions described herein. In some cases, the memory 1125 may contain, among other things, a BIOS which may control basic hardware and/or software operation such as the interaction with peripheral components or devices.

Software 1130 may include code to implement aspects of the present disclosure, including code to support sTAGs with only LAA SCells. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described above. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas. In some cases, the wireless device may include a single antenna 1140. However, in other cases, the device may have more than one antenna 1140, which may be capable of concurrently transmitting or receiving multiple wireless transmissions.

I/O controller 1145 may manage input and output signals for device 1105. I/O controller 1145 may also manage peripherals not integrated into device 1105. In some cases, I/O controller 1145 may represent a physical connection or port to an external peripheral. In some cases, I/O controller 1145 may utilize an operating system such as iOS®, ANDROID®, MS-DOS®, MS-WINDOWS®, OS/2®, UNIX®, LINUX®, or another known operating system. In other cases, I/O controller 1145 may represent or interact with a modem, a keyboard, a mouse, a touchscreen, or a similar device. In some cases, I/O controller 1145 may be implemented as part of a processor. In some cases, a user may interact with device 1105 via I/O controller 1145 or via hardware components controlled by I/O controller 1145.

Figure 12:
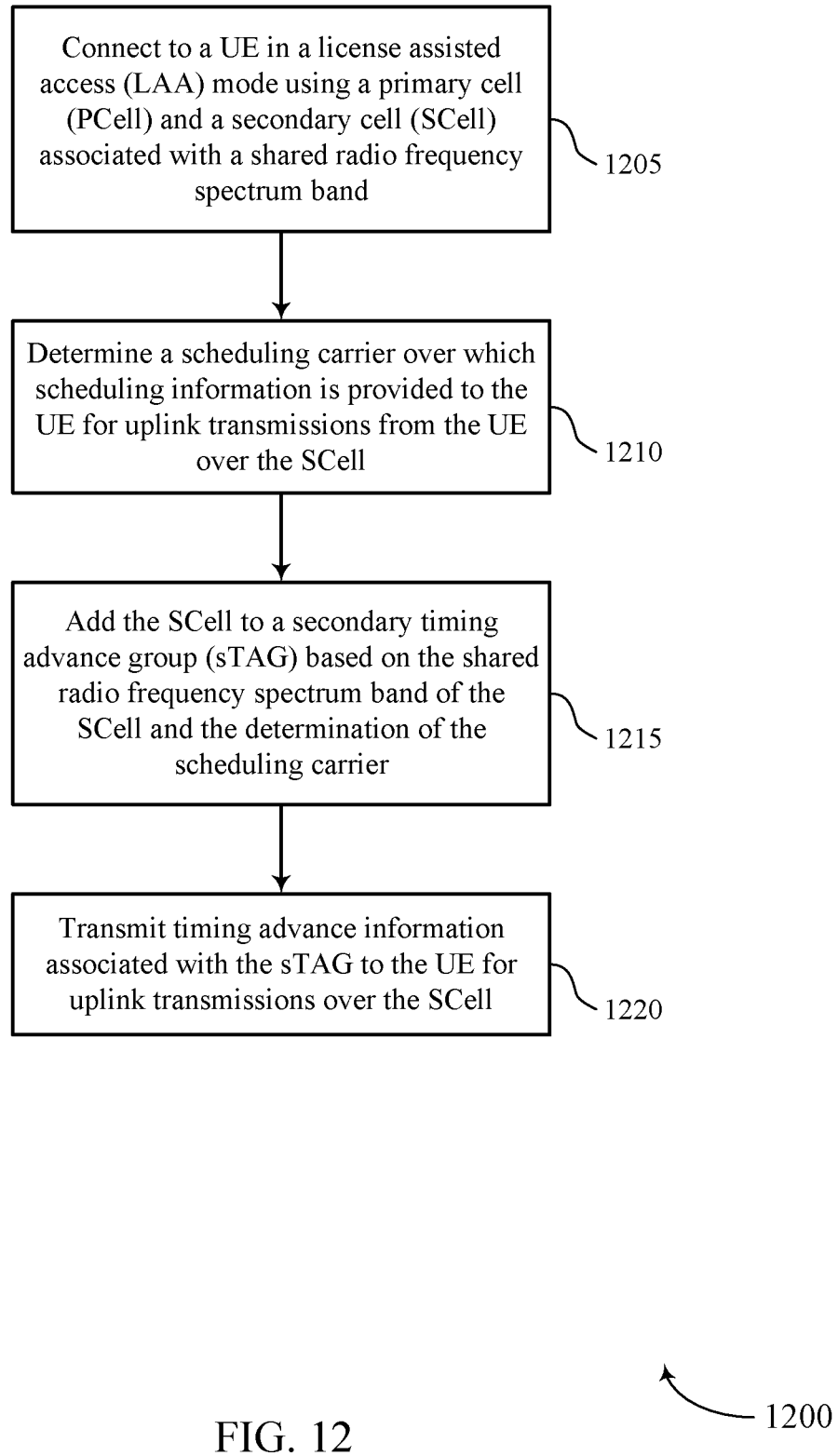
FIGS. 12-15 illustrate methods for supporting sTAGs with only LAA SCells in accordance with various aspects of the present disclosure.

FIG. 12 shows a flowchart illustrating a method 1200 for supporting sTAGs with only LAA SCells in accordance with various aspects of the present disclosure. The operations of method 1200 may be implemented by a base station 105 or its components as described herein. For example, the operations of method 1200 may be performed by a base station wireless communication manager as described with reference to FIGS. 4 through 7. In some examples, a base station 105 may execute a set of codes to control the functional elements of the device to perform the functions described below. Additionally or alternatively, the base station 105 may perform aspects of the functions described below using special-purpose hardware.

At block 1205, the base station 105 may connect to a UE in an LAA mode using a PCell and an SCell associated with a shared radio frequency spectrum band. The operations of block 1205 may be performed according to the methods described with reference to FIGS. 1 through 3. In certain examples, aspects of the operations of block 1205 may be performed by a connection manager as described with reference to FIGS. 4 through 7.

At block 1210, the base station 105 may determine a scheduling carrier over which scheduling information is provided to the UE for uplink transmissions from the UE over the SCell. The operations of block 1210 may be performed according to the methods described with reference to FIGS. 1 through 3. In certain examples, aspects of the operations of block 1210 may be performed by a scheduling carrier determiner as described with reference to FIGS. 4 through 7.

At block 1215, the base station 105 may add the SCell to an sTAG based at least in part on the shared radio frequency spectrum band of the SCell and the determination of the scheduling carrier. The operations of block 1215 may be performed according to the methods described with reference to FIGS. 1 through 3. In certain examples, aspects of the operations of block 1215 may be performed by a TAG manager as described with reference to FIGS. 4 through 7.

At block 1220, the base station 105 may transmit timing advance information associated with the sTAG to the UE for uplink transmissions over the SCell. The operations of block 1220 may be performed according to the methods described with reference to FIGS. 1 through 3. In certain examples, aspects of the operations of block 1220 may be performed by a transmitter as described with reference to FIGS. 4 through 7.

Figure 13:
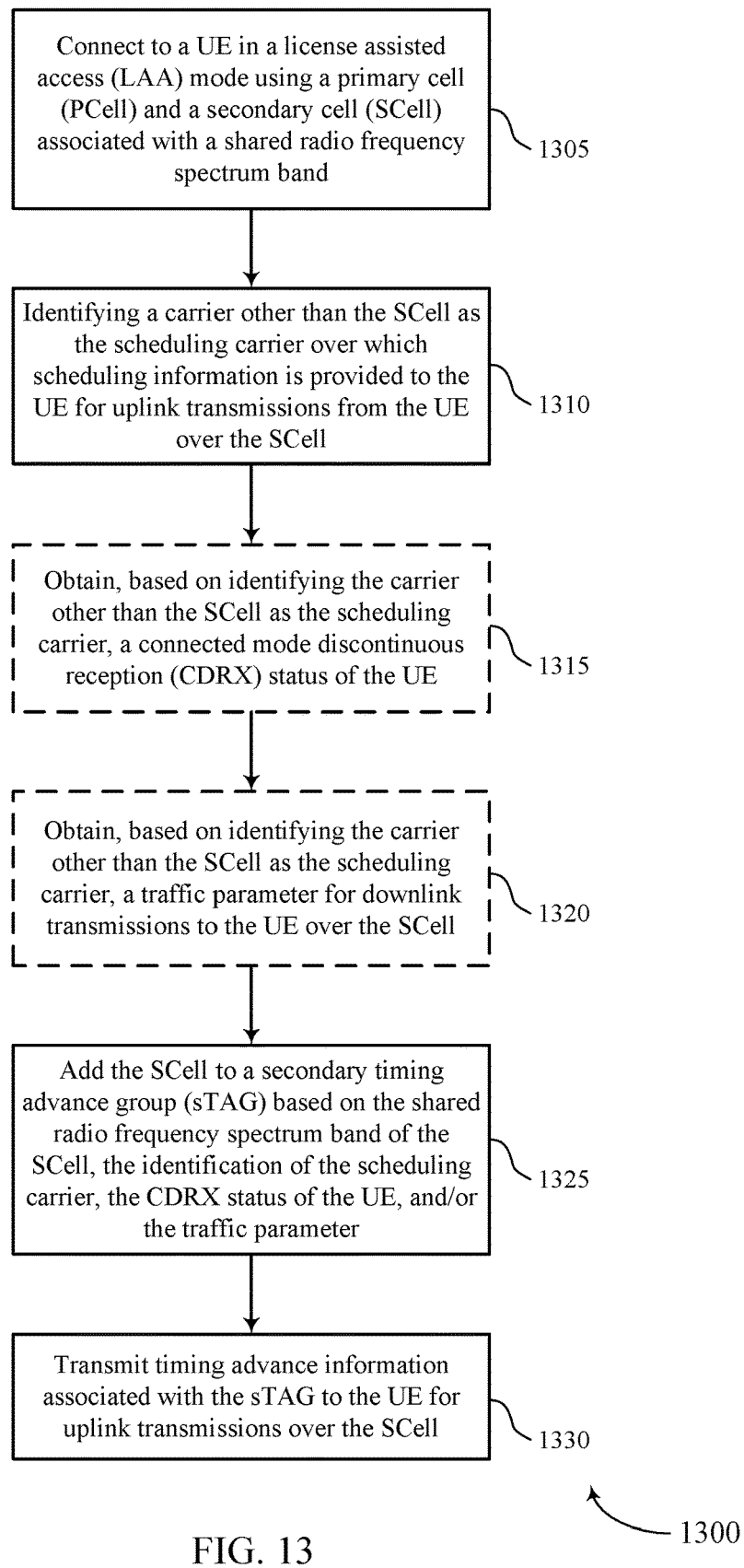

FIG. 13 shows a flowchart illustrating a method 1300 for supporting sTAGs with only LAA SCells in accordance with various aspects of the present disclosure. The operations of method 1300 may be implemented by a base station 105 or its components as described herein. For example, the operations of method 1300 may be performed by a base station wireless communication manager as described with reference to FIGS. 4 through 7. In some examples, a base station 105 may execute a set of codes to control the functional elements of the device to perform the functions described below. Additionally or alternatively, the base station 105 may perform aspects of the functions described below using special-purpose hardware.

At block 1305, the base station 105 may connect to a UE in an LAA mode using a PCell and an SCell associated with a shared radio frequency spectrum band. The operations of block 1305 may be performed according to the methods described with reference to FIGS. 1 through 3. In certain examples, aspects of the operations of block 1305 may be performed by a connection manager as described with reference to FIGS. 4 through 7.

At block 1310, the base station 105 may identify a carrier other than the SCell as the scheduling carrier over which scheduling information is provided to the UE for uplink transmissions from the UE over the SCell. The operations of block 1310 may be performed according to the methods described with reference to FIGS. 1 through 3. In certain examples, aspects of the operations of block 1310 may be performed by a scheduling carrier determiner as described with reference to FIGS. 4 through 7.

At block 1315, the base station 105 may obtain, based on identifying the carrier other than the SCell as the scheduling carrier, a CDRX status of the UE. The operations of block 1315 may be performed according to the methods described with reference to FIGS. 1 through 3. In certain examples, aspects of the operations of block 1315 may be performed by a CDRX status identifier as described with reference to FIGS. 4 through 7.

At block 1320, the base station 105 may obtain, based on identifying the carrier other than the SCell as the scheduling carrier, a traffic parameter for downlink transmissions to the UE over the SCell. The operations of block 1320 may be performed according to the methods described with reference to FIGS. 1 through 3. In certain examples, aspects of the operations of block 1320 may be performed by a traffic parameter identifier as described with reference to FIGS. 4 through 7.

At block 1325, the base station 105 may add the SCell to an sTAG based on the shared radio frequency spectrum band of the SCell, the identification of the scheduling carrier, the CDRX status of the UE, and/or the traffic parameter. The operations of block 1325 may be performed according to the methods described with reference to FIGS. 1 through 3. In certain examples, aspects of the operations of block 1325 may be performed by a TAG manager as described with reference to FIGS. 4 through 7.

At block 1330, the base station 105 may transmit timing advance information associated with the sTAG to the UE for uplink transmissions over the SCell. The operations of block 1330 may be performed according to the methods described with reference to FIGS. 1 through 3. In certain examples, aspects of the operations of block 1330 may be performed by a transmitter as described with reference to FIGS. 4 through 7.

Figure 14:
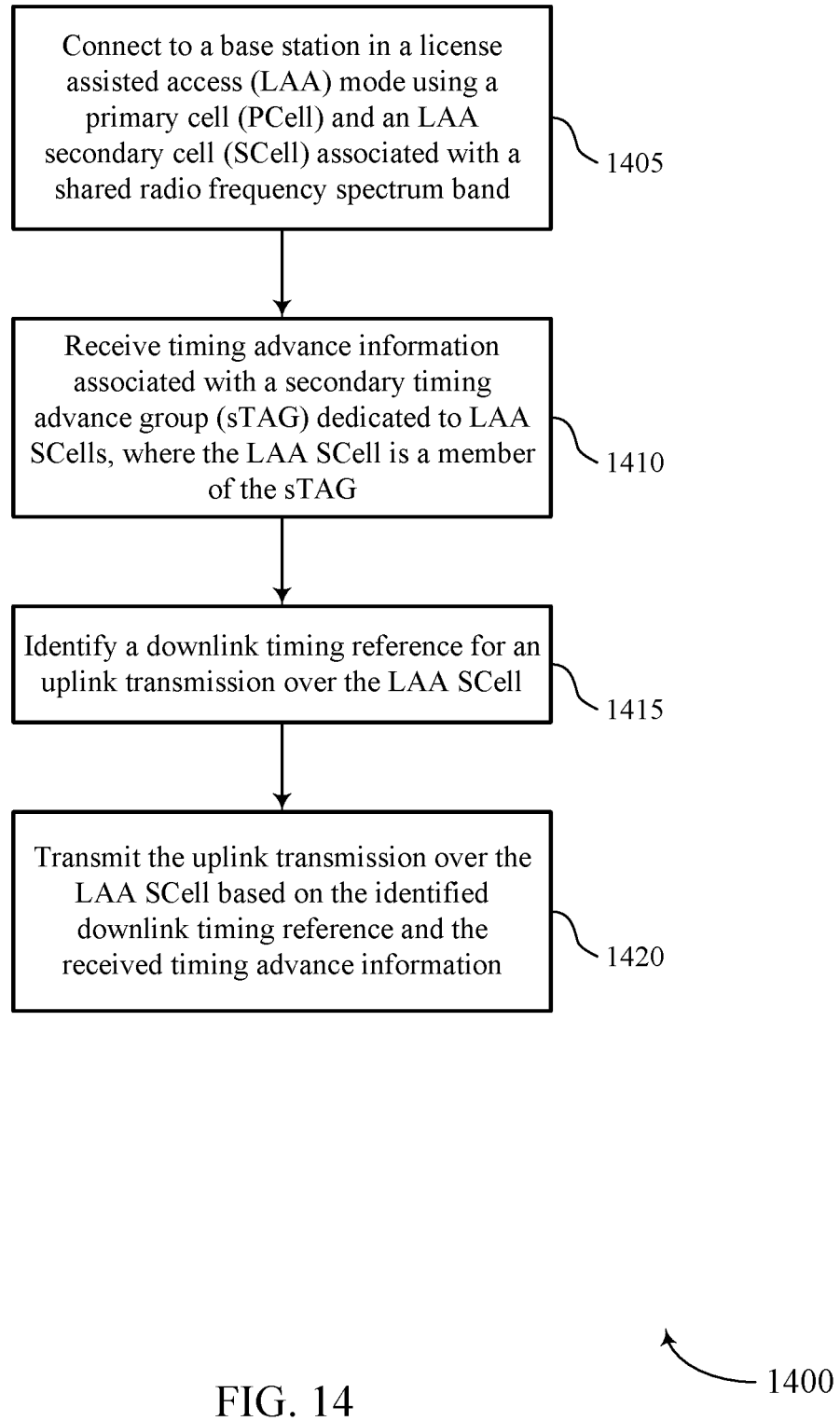

FIG. 14 shows a flowchart illustrating a method 1400 for supporting sTAGs with only LAA SCells in accordance with various aspects of the present disclosure. The operations of method 1400 may be implemented by a UE 115 or its components as described herein. For example, the operations of method 1400 may be performed by a UE wireless communication manager as described with reference to FIGS. 8 through 11. In some examples, a UE 115 may execute a set of codes to control the functional elements of the device to perform the functions described below. Additionally or alternatively, the UE 115 may perform aspects of the functions described below using special-purpose hardware.

At block 1405, the UE 115 may connect to a base station in an LAA mode using a PCell and an LAA SCell associated with a shared radio frequency spectrum band. The operations of block 1405 may be performed according to the methods described with reference to FIGS. 1 through 3. In certain examples, aspects of the operations of block 1405 may be performed by a connection manager as described with reference to FIGS. 8 through 11.

At block 1410, the UE 115 may receive timing advance information associated with an sTAG dedicated to LAA SCells, wherein the LAA SCell is a member of the sTAG. The operations of block 1410 may be performed according to the methods described with reference to FIGS. 1 through 3. In certain examples, aspects of the operations of block 1410 may be performed by a receiver as described with reference to FIGS. 8 through 11.

At block 1415, the UE 115 may identify a downlink timing reference for an uplink transmission over the LAA SCell. The operations of block 1415 may be performed according to the methods described with reference to FIGS. 1 through 3. In certain examples, aspects of the operations of block 1415 may be performed by a timing reference identifier as described with reference to FIGS. 8 through 11.

At block 1420, the UE 115 may transmit the uplink transmission over the LAA SCell based at least in part on the identified downlink timing reference and the received timing advance information. The operations of block 1420 may be performed according to the methods described with reference to FIGS. 1 through 3. In certain examples, aspects of the operations of block 1420 may be performed by a transmitter as described with reference to FIGS. 8 through 11.

Figure 15:
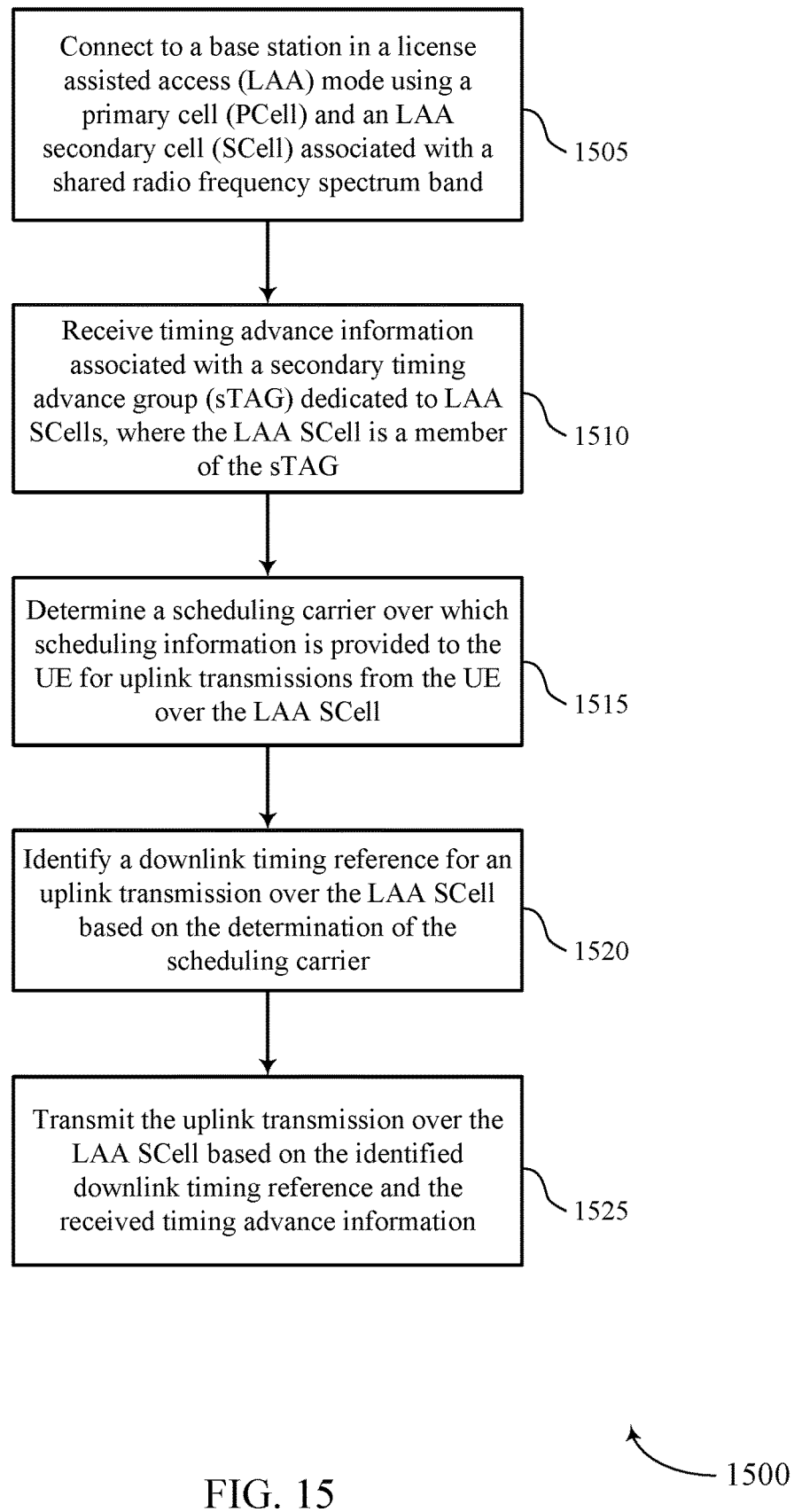

FIG. 15 shows a flowchart illustrating a method 1500 for supporting sTAGs with only LAA SCells in accordance with various aspects of the present disclosure. The operations of method 1500 may be implemented by a UE 115 or its components as described herein. For example, the operations of method 1500 may be performed by a UE wireless communication manager as described with reference to FIGS. 8 through 11. In some examples, a UE 115 may execute a set of codes to control the functional elements of the device to perform the functions described below. Additionally or alternatively, the UE 115 may perform aspects of the functions described below using special-purpose hardware.

At block 1505, the UE 115 may connect to a base station in an LAA mode using a PCell and an LAA SCell associated with a shared radio frequency spectrum band. The operations of block 1505 may be performed according to the methods described with reference to FIGS. 1 through 3. In certain examples, aspects of the operations of block 1505 may be performed by a connection manager as described with reference to FIGS. 8 through 11.

At block 1510, the UE 115 may receive timing advance information associated with an sTAG dedicated to LAA SCells, wherein the LAA SCell is a member of the sTAG. The operations of block 1510 may be performed according to the methods described with reference to FIGS. 1 through 3. In certain examples, aspects of the operations of block 1510 may be performed by a receiver as described with reference to FIGS. 8 through 11.

At block 1515, the UE 115 may determine a scheduling carrier over which scheduling information is provided to the UE for uplink transmissions from the UE over the LAA SCell. The operations of block 1515 may be performed according to the methods described with reference to FIGS. 1 through 3. In certain examples, aspects of the operations of block 1515 may be performed by a scheduling carrier determiner as described with reference to FIGS. 8 through 11.

At block 1520, the UE 115 may identify a downlink timing reference for an uplink transmission over the LAA SCell based on the determination of the scheduling carrier. For example, if the UE 115 determines that the LAA SCell is the scheduling carrier, UE 115 may determine that uplink grants may be transmitted over the LAA SCell to schedule uplink transmissions from the UE 115. Thus, the UE 115 may receive the uplink grant for an uplink transmission, and identify a downlink timing reference for the uplink transmission based on the uplink grant. Otherwise, the UE 115 may identify the downlink timing reference based on a downlink transmission received from another LAA SCell in the sTAG. The operations of block 1520 may be performed according to the methods described with reference to FIGS. 1 through 3. In certain examples, aspects of the operations of block 1520 may be performed by a timing reference identifier as described with reference to FIGS. 8 through 11.

At block 1525, the UE 115 may transmit the uplink transmission over the LAA SCell based at least in part on the identified downlink timing reference and the received timing advance information. The operations of block 1525 may be performed according to the methods described with reference to FIGS. 1 through 3. In certain examples, aspects of the operations of block 1525 may be performed by a transmitter as described with reference to FIGS. 8 through 11.

It should be noted that the methods described above describe possible implementations, and that the operations and the signaling may be rearranged or otherwise modified and that other implementations are possible. Furthermore, aspects from two or more of the methods may be combined.

Techniques described herein may be used for various wireless communication systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are releases of Universal Mobile Telecommunications System (UMTS) that use E-UTRA. UTRA, E-UTRA, UMTS, LTE, LTE-A, NR, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communication system or systems described herein may include a heterogeneous LTE/LTE-A or NR network in which different types of evolved node B (eNBs) provide coverage for various geographical regions. For example, each eNB, gNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), next generation NodeB (gNB), Home NodeB, a Home eNodeB, or some other suitable terminology. The geographic coverage area for a base station may be divided into sectors making up only a portion of the coverage area. The wireless communication system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communication system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary operation that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a base station, comprising:
    connecting to a user equipment (UE) in a license assisted access (LAA) mode using a primary cell (PCell) and a secondary cell (SCell) associated with a shared radio frequency spectrum band;
    determining a scheduling carrier over which scheduling information is provided to the UE for uplink transmissions from the UE over the SCell;
    adding the SCell to a secondary timing advance group (sTAG) based at least in part on the shared radio frequency spectrum band of the SCell and the determination of the scheduling carrier; and
transmitting timing advance information associated with the sTAG to the UE for uplink transmissions over the SCell.

2. The method of claim 1, wherein determining the scheduling carrier comprises:
identifying the SCell as the scheduling carrier;
wherein the SCell is added to the sTAG based on the identification of the SCell as the scheduling carrier.

3. The method of claim 1, wherein determining the scheduling carrier comprises:
identifying a carrier other than the SCell as the scheduling carrier.

4. The method of claim 3, further comprising:
obtaining, based on identifying the carrier other than the SCell as the scheduling carrier, a connected mode discontinuous reception (CDRX) status of the UE;
wherein the CDRX status indicates that CDRX is not configured for the UE and the SCell is added to the sTAG based on the obtained CDRX status.

5. The method of claim 3, further comprising:
obtaining, based on identifying the carrier other than the SCell as the scheduling carrier, a traffic parameter for downlink transmissions to the UE over the SCell;
SPE wherein the SCell is added to the sTAG based on the traffic parameter.

6. The method of claim 1, wherein the sTAG comprises only LAA SCells.

7. A method for wireless communication at a user equipment (UE), comprising:
connecting to a base station in a license assisted access (LAA) mode using a primary cell (PCell) and an LAA secondary cell (SCell) associated with a shared radio frequency spectrum band;
receiving timing advance information associated with a secondary timing advance group (sTAG) dedicated to LAA SCells, wherein the LAA SCell is a member of the sTAG;
identifying a downlink timing reference for an uplink transmission over the LAA SCell; and
transmitting the uplink transmission over the LAA SCell based at least in part on the identified downlink timing reference and the received timing advance information.

8. The method of claim 7, further comprising:
determining a scheduling carrier over which scheduling information is provided to the UE for uplink transmissions from the UE over the LAA SCell;
wherein the downlink timing reference for the uplink transmission is identified based at least in part on the determination of the scheduling carrier.

9. The method of claim 7, wherein identifying the downlink timing reference for the uplink transmission comprises:
identifying the downlink timing reference for the uplink transmission based at least in part on a downlink transmission received over the LAA SCell.

10. The method of claim 7, wherein identifying the downlink timing reference for the uplink transmission comprises:
identifying the downlink timing reference for the uplink transmission based at least in part on a downlink transmission received over another LAA SCell that is a member of the sTAG.

11. The method of claim 7, further comprising:
identifying a carrier-to-interference-and-noise ratio (CINR) associated with each of a plurality of LAA SCells that are members of the sTAG;
wherein the downlink timing reference is identified based at least in part on the CINR of each of the plurality of LAA SCells.

12. The method of claim 7, further comprising:
identifying a combined downlink timing reference based at least in part on downlink transmissions received over a plurality of LAA SCells that are members of the sTAG;
wherein the downlink timing reference is identified based at least in part on the combined downlink timing reference.

13. The method of claim 12, further comprising:
identifying a carrier-to-interference-and-noise ratio (CINR) associated with each of the plurality of LAA SCells;
wherein the combined downlink timing reference is identified based at least in part on the CINR associated with each of the plurality of LAA SCells.

14. The method of claim 7, wherein the sTAG comprises only the LAA SCell.

15. The method of claim 7, wherein the sTAG comprises a plurality of LAA SCells.

16. An apparatus for wireless communication at a base station, comprising:
a processor;
memory in electronic communication with the processor; and
instructions stored in the memory, wherein the instructions are executable by the processor to:
connect to a user equipment (UE) in a license assisted access (LAA) mode using a primary cell (PCell) and a secondary cell (SCell) associated with a shared radio frequency spectrum band;
determine a scheduling carrier over which scheduling information is provided to the UE for uplink transmissions from the UE over the SCell;
add the SCell to a secondary timing advance group (sTAG) based at least in part on the shared radio frequency spectrum band of the SCell and the determination of the scheduling carrier; and
transmit timing advance information associated with the sTAG to the UE for uplink transmissions over the SCell.

17. The apparatus of claim 16, wherein the instructions executable by the processor to determine the scheduling carrier comprise instructions executable by the processor to:
identify the SCell as the scheduling carrier;
wherein the SCell is added to the sTAG based on the identification of the SCell as the scheduling carrier.

18. The apparatus of claim 16, wherein the instructions executable by the processor to determine the scheduling carrier comprise instructions executable by the processor to:
identify a carrier other than the SCell as the scheduling carrier.

19. The apparatus of claim 18, wherein the instructions are further executable by the processor to:
obtain, based on identifying the carrier other than the SCell as the scheduling carrier, a connected mode discontinuous reception (CDRX) status of the UE;
wherein the CDRX status indicates that CDRX is not configured for the UE and the SCell is added to the sTAG based on the obtained CDRX status.

20. The apparatus of claim 18, wherein the instructions are further executable by the processor to:
obtain, based on identifying the carrier other than the SCell as the scheduling carrier, a traffic parameter for downlink transmissions to the UE over the SCell;

wherein the SCell is added to the sTAG based on the traffic parameter.

21. The apparatus of claim 16, wherein the sTAG comprises only LAA SCells.

22. An apparatus for wireless communication at a user equipment (UE), comprising:
a processor;
memory in electronic communication with the processor; and
instructions stored in the memory, wherein the instructions are executable by the processor to:
connect to a base station in a license assisted access (LAA) mode using a primary cell (PCell) and an LAA secondary cell (SCell) associated with a shared radio frequency spectrum band;
receive timing advance information associated with a secondary timing advance group (sTAG) dedicated to LAA SCells, wherein the LAA SCell is a member of the sTAG;
identify a downlink timing reference for an uplink transmission over the LAA SCell; and
transmit the uplink transmission over the LAA SCell based at least in part on the identified downlink timing reference and the received timing advance information.

23. The apparatus of claim 22, wherein the instructions are further executable by the processor to:
determine a scheduling carrier over which scheduling information is provided to the UE for uplink transmissions from the UE over the LAA SCell;
wherein the downlink timing reference for the uplink transmission is identified based at least in part on the determination of the scheduling carrier.

24. The apparatus of claim 22, wherein the instructions executable by the processor to identify the downlink timing reference for the uplink transmission comprise instructions executable by the processor to:
identify the downlink timing reference for the uplink transmission based at least in part on a downlink transmission received over the LAA SCell.

25. The apparatus of claim 22, wherein the instructions executable by the processor to identify the downlink timing reference for the uplink transmission comprise instructions executable by the processor to:
identify the downlink timing reference for the uplink transmission based at least in part on a downlink transmission received over another LAA SCell that is a member of the sTAG.

26. The apparatus of claim 22, wherein the instructions are further executable by the processor to:
identify a carrier-to-interference-and-noise ratio (CINR) associated with each of a plurality of LAA SCells that are members of the sTAG;
wherein the downlink timing reference is identified based at least in part on the CINR of each of the plurality of LAA SCells.

27. The apparatus of claim 22, wherein the instructions are further executable by the processor to:
identify a combined downlink timing reference based at least in part on downlink transmissions received over a plurality of LAA SCells that are members of the sTAG;
wherein the downlink timing reference is identified based at least in part on the combined downlink timing reference.

28. The apparatus of claim 27, wherein the instructions are further executable by the processor to:
identify a carrier-to-interference-and-noise ratio (CINR) associated with each of the plurality of LAA SCells;
wherein the combined downlink timing reference is identified based at least in part on the CINR associated with each of the plurality of LAA SCells.

29. The apparatus of claim 22, wherein the sTAG comprises only the LAA SCell.

30. The apparatus of claim 22, wherein the sTAG comprises a plurality of LAA SCells.

* * * * *